(12) United States Patent
Tanaka et al.

(10) Patent No.: US 9,753,271 B2
(45) Date of Patent: Sep. 5, 2017

(54) EYEPIECE LENS, VIEWFINDER OPTICAL SYSTEM AND OPTICAL APPARATUS EQUIPPED WITH THE SAME, AND METHOD FOR MANUFACTURING EYEPIECE LENS

(71) Applicant: Nikon Corporation, Minato-ku, Tokyo (JP)

(72) Inventors: Issei Tanaka, Yokohama (JP); Hiroki Harada, Zushi (JP); Taku Matsuo, Kawasaki (JP)

(73) Assignee: Nikon Corporation, Tokyo (JP)

(*) Notice: Subject to any disclaimer, the term of this patent is extended or adjusted under 35 U.S.C. 154(b) by 3 days.

(21) Appl. No.: 15/062,078

(22) Filed: Mar. 5, 2016

(65) Prior Publication Data

US 2016/0187641 A1 Jun. 30, 2016

Related U.S. Application Data

(63) Continuation of application No. 14/314,825, filed on Jun. 25, 2014, now abandoned, which is a (Continued)

(30) Foreign Application Priority Data

Dec. 28, 2011 (JP) ................................ 2011-289183

(51) Int. Cl.
*G02B 25/00* (2006.01)
*G02B 23/14* (2006.01)
(Continued)

(52) U.S. Cl.
CPC .............. *G02B 25/001* (2013.01); *G02B 1/11* (2013.01); *G02B 1/115* (2013.01); *G02B 9/12* (2013.01);
(Continued)

(58) Field of Classification Search
CPC ........ G02B 25/001; G02B 9/56; G02B 1/115; G02B 1/11; G02B 9/12; G02B 13/18;
(Continued)

(56) References Cited

U.S. PATENT DOCUMENTS

| 5,446,590 A * | 8/1995 | Kikuchi ................ G02B 25/00 |
| | | 359/645 |
| 6,263,168 B1 | 7/2001 | Hasushita |

(Continued)

FOREIGN PATENT DOCUMENTS

| CN | 102129117 A | 7/2011 |
| JP | H10-123436 A | 5/1998 |

(Continued)

OTHER PUBLICATIONS

International Search Report from International Patent Application No. PCT/JP2012/008184, Apr. 2, 2013.

*Primary Examiner* — Jordan Schwartz
*Assistant Examiner* — George G King
(74) *Attorney, Agent, or Firm* — Shapiro, Gabor and Rosenberger, PLLC

(57) ABSTRACT

An eyepiece lens (EL) used for a viewfinder optical system (VF) for viewing, using the eyepiece lens (EL), an image formed by an objective lens (OL), an image displayed by a display member, or an object, wherein an antireflection coating (101) is disposed on at least one surface among the optical surfaces constituting the eyepiece lens (EL), and the antireflection coating (101) includes at least one layer (101*g*) formed by a wet process.

22 Claims, 31 Drawing Sheets

Related U.S. Application Data continuation of application No. PCT/JP2012/008184, filed on Dec. 21, 2012.

(51) Int. Cl.
| | |
|---|---|
| *G02B 27/00* | (2006.01) |
| *G02B 13/18* | (2006.01) |
| *G03B 13/08* | (2006.01) |
| *G02B 1/11* | (2015.01) |
| *G02B 9/12* | (2006.01) |
| *G02B 1/115* | (2015.01) |
| *G03B 13/06* | (2006.01) |
| *G02B 9/56* | (2006.01) |

(52) U.S. Cl.
CPC ............ *G02B 13/18* (2013.01); *G02B 23/14* (2013.01); *G02B 27/0018* (2013.01); *G03B 13/06* (2013.01); *G03B 13/08* (2013.01); *G02B 9/56* (2013.01)

(58) Field of Classification Search
CPC .... G02B 23/14; G02B 27/0018; G02B 13/08; G03B 13/06

USPC .................................................. 359/643–645

See application file for complete search history.

(56) References Cited

U.S. PATENT DOCUMENTS

| | | |
|---|---|---|
| 6,296,943 B1 | 10/2001 | Watanabe et al. |
| 2005/0013011 A1 | 1/2005 | Ohshita |
| 2005/0225878 A1 | 10/2005 | Tanaka |
| 2006/0291061 A1 | 12/2006 | Iyama |
| 2011/0170195 A1 | 7/2011 | Muratani et al. |
| 2012/0026590 A1 | 2/2012 | Muratani et al. |

FOREIGN PATENT DOCUMENTS

| | | |
|---|---|---|
| JP | H10-245523 A | 9/1998 |
| JP | 2000-356704 A | 12/2000 |
| JP | 2001-051319 A | 2/2001 |
| JP | 2006-342311 A | 12/2006 |
| JP | 2007-322967 A | 12/2007 |
| JP | 2007-322968 A | 12/2007 |
| JP | 2008-052085 A | 3/2008 |
| JP | 2001-324684 A | 11/2011 |

* cited by examiner

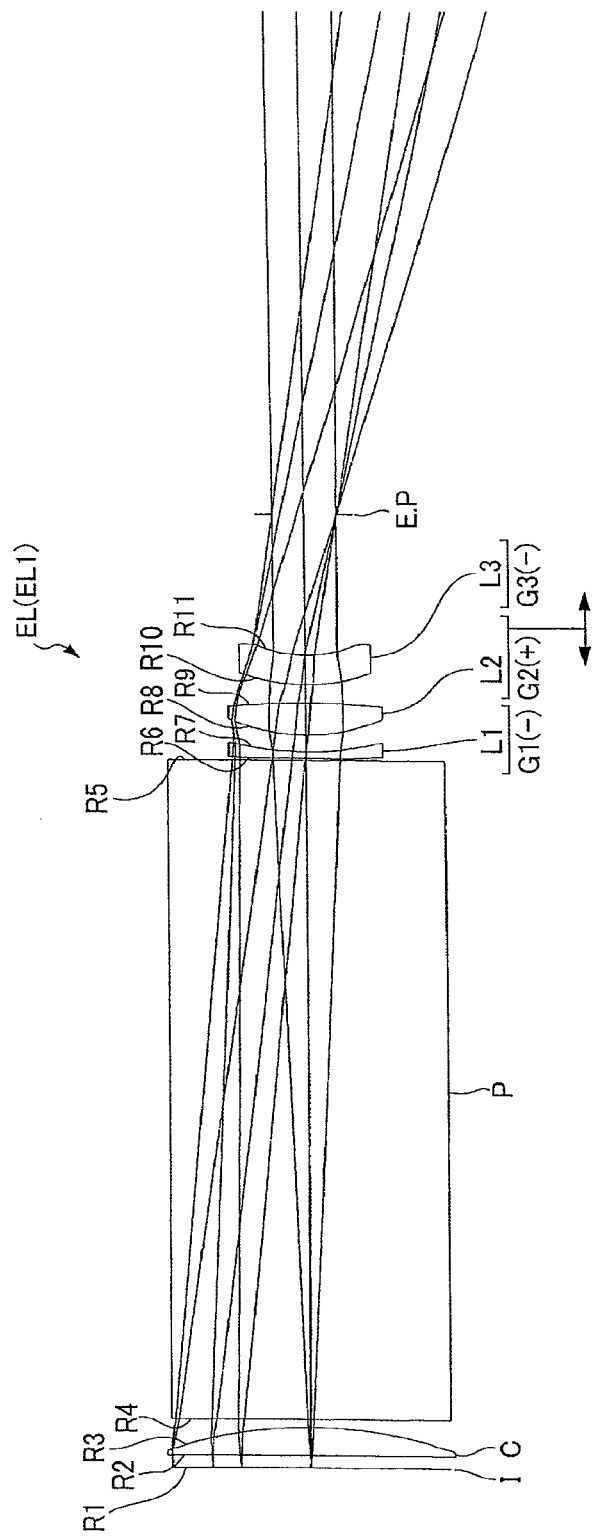

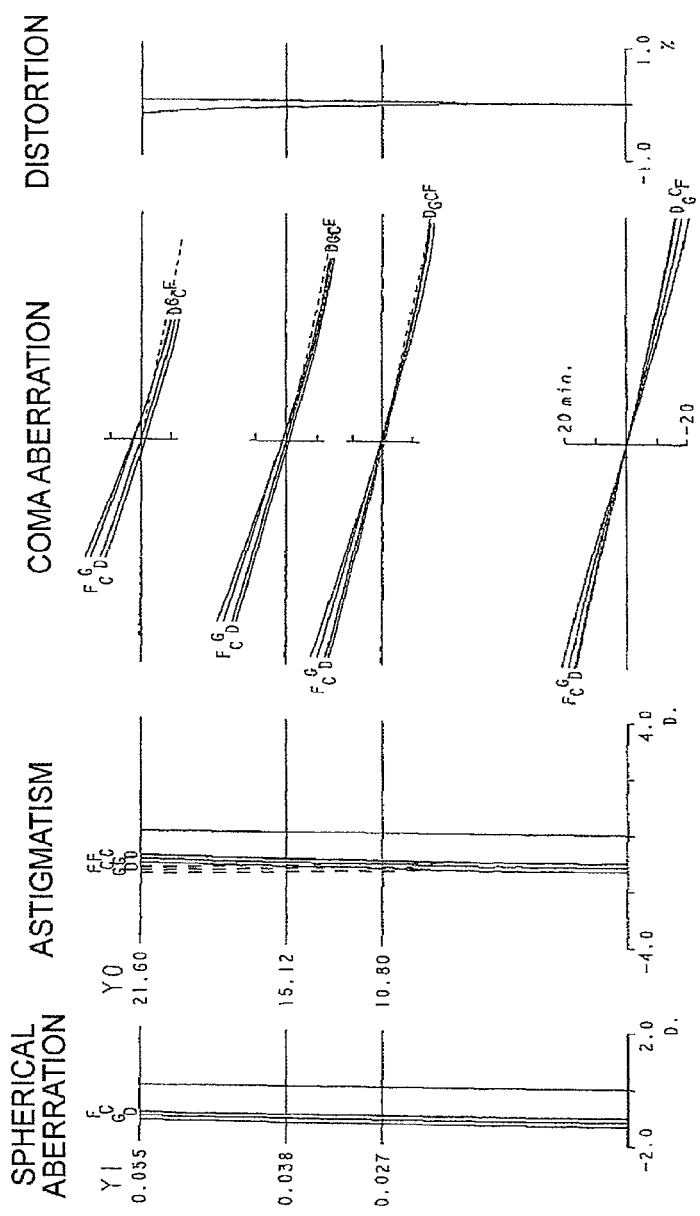

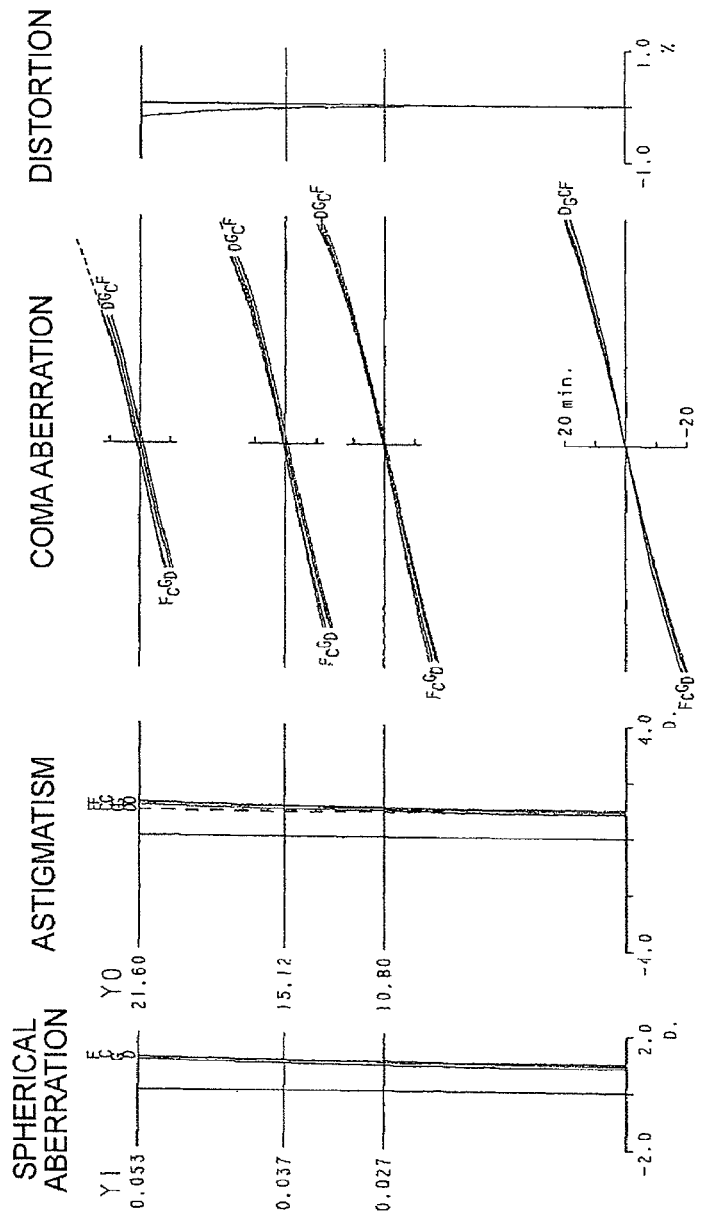

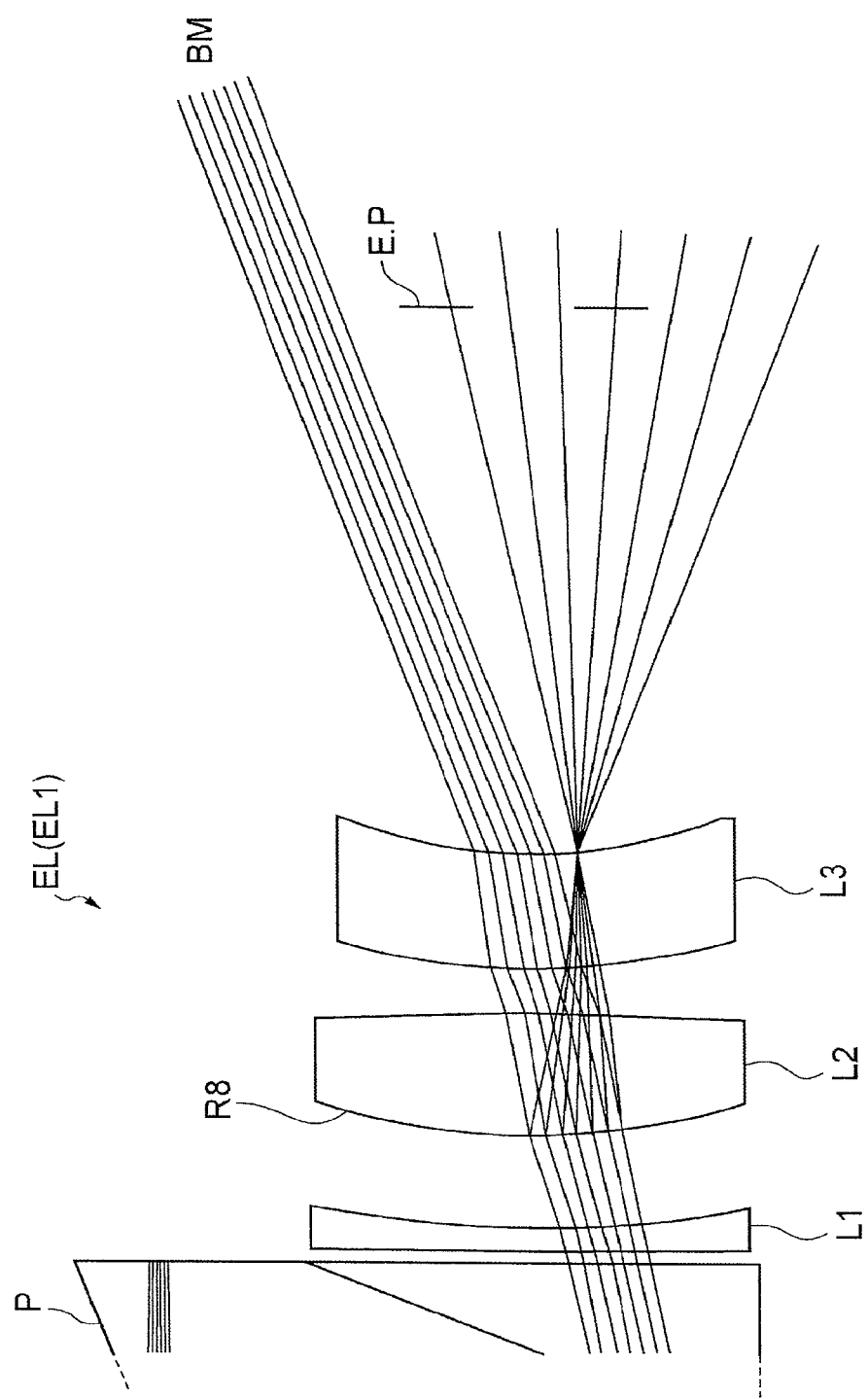

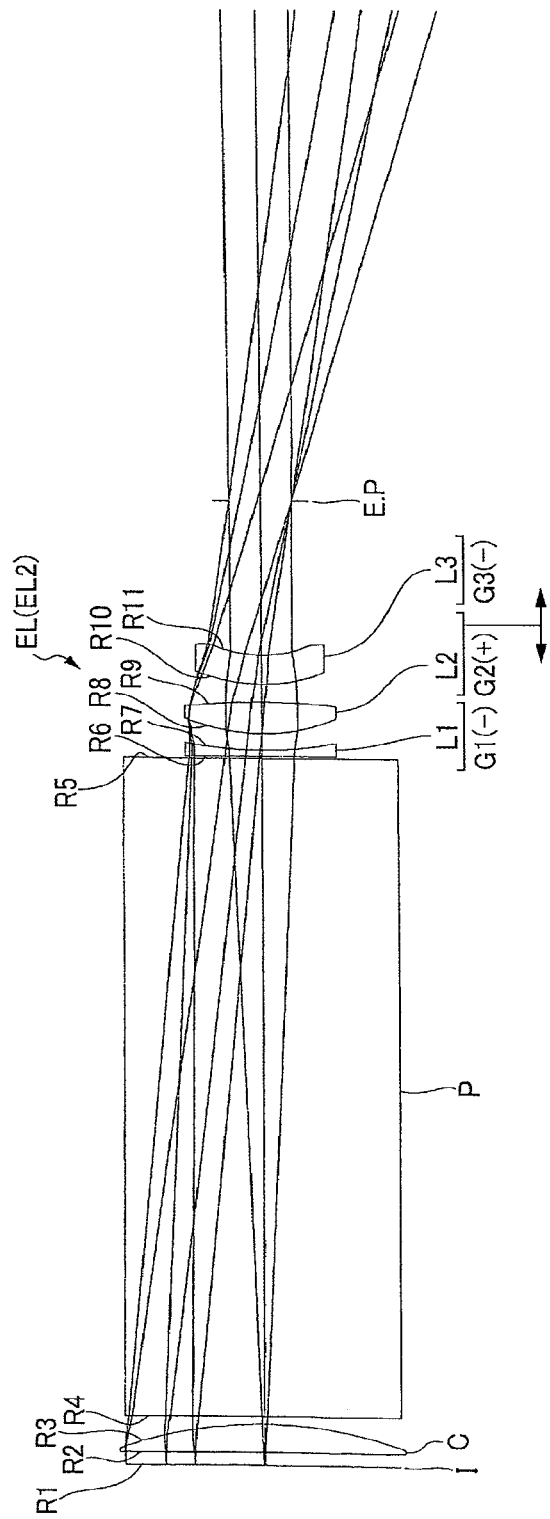

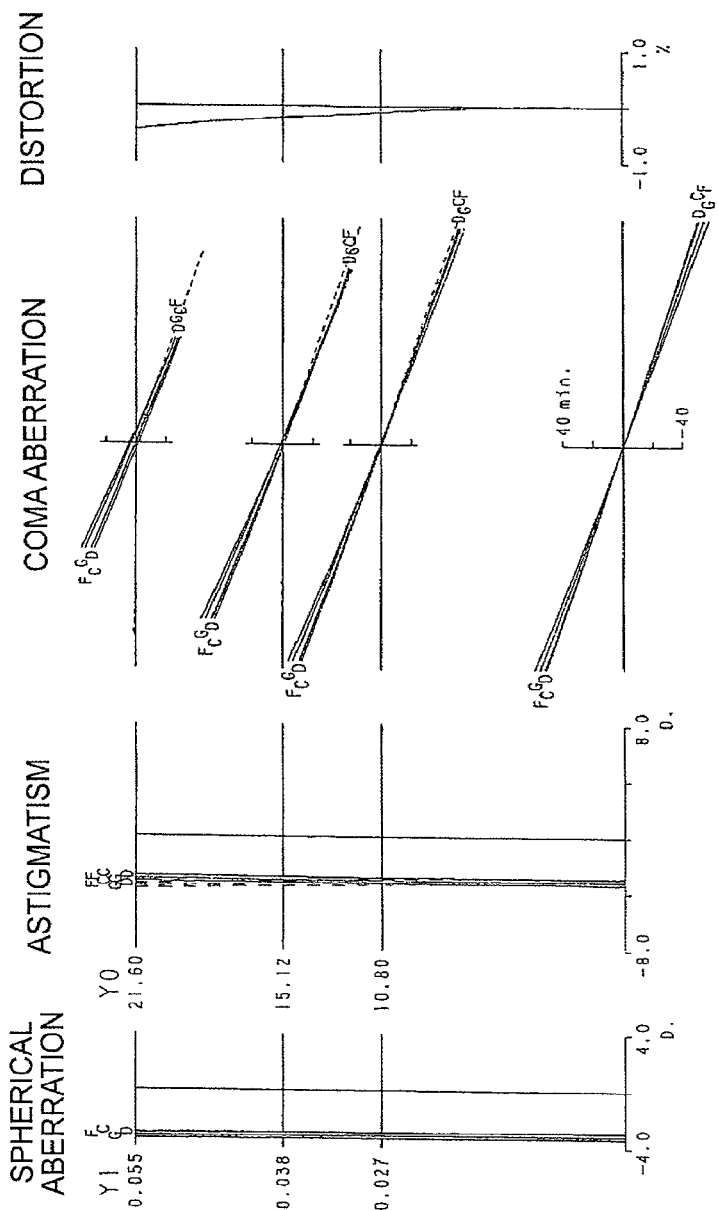

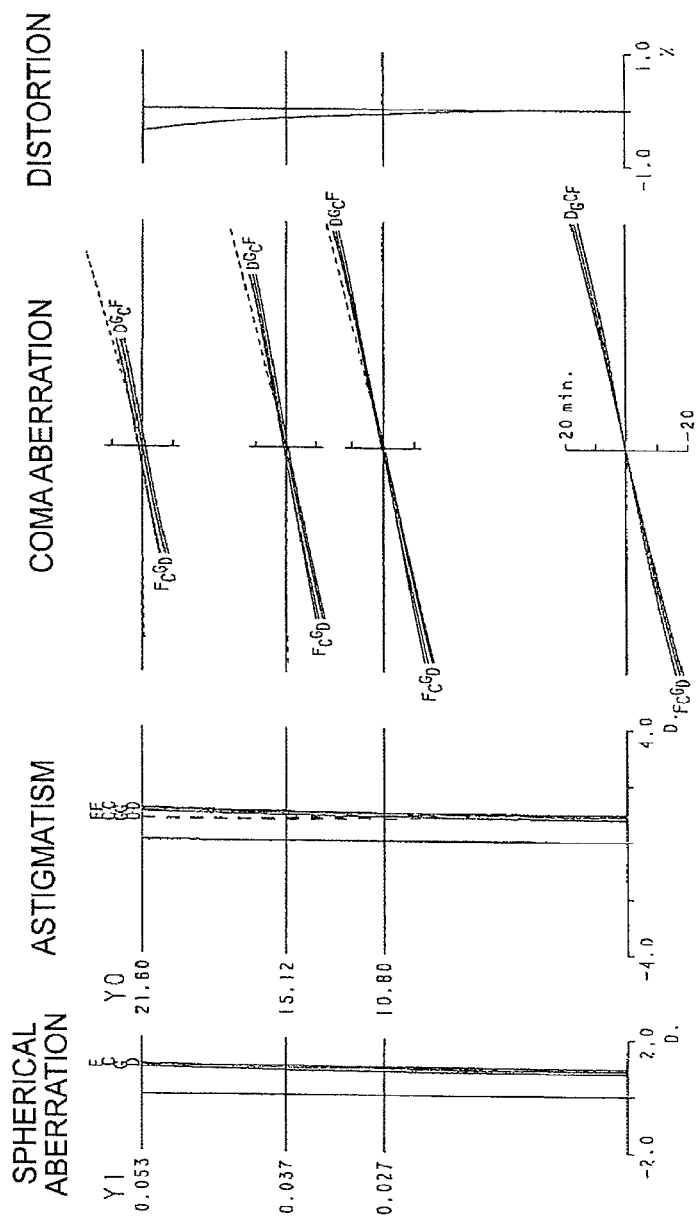

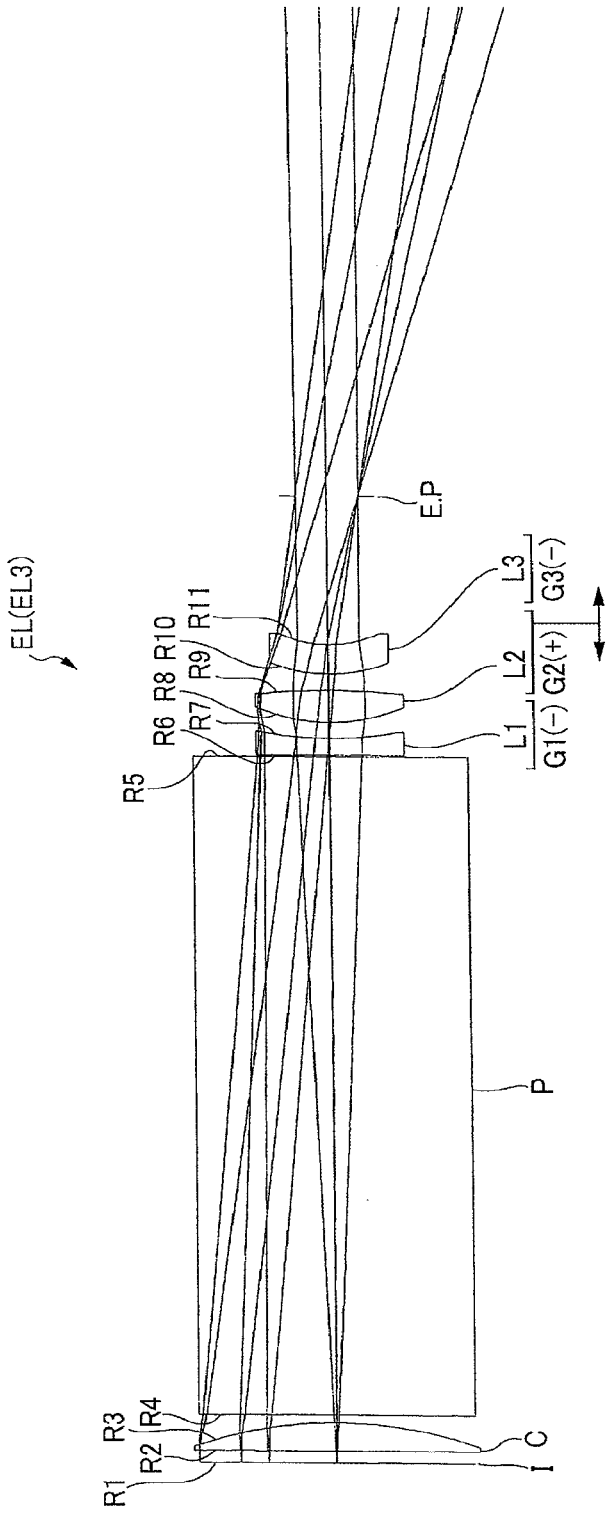

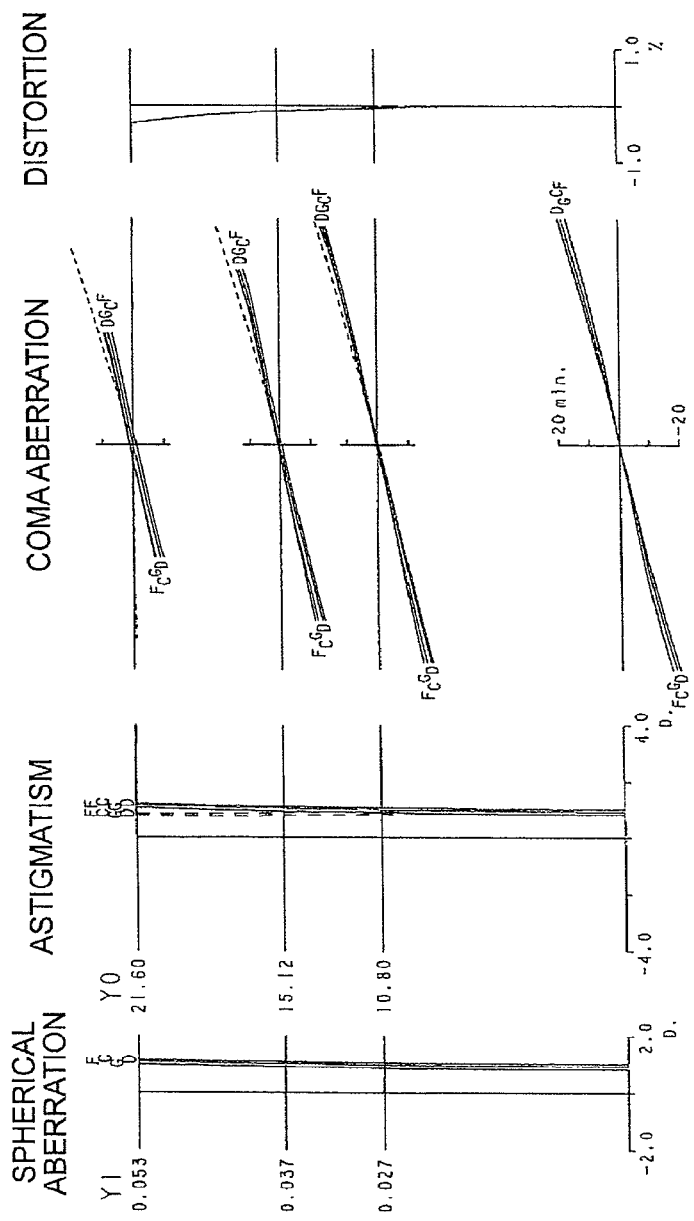

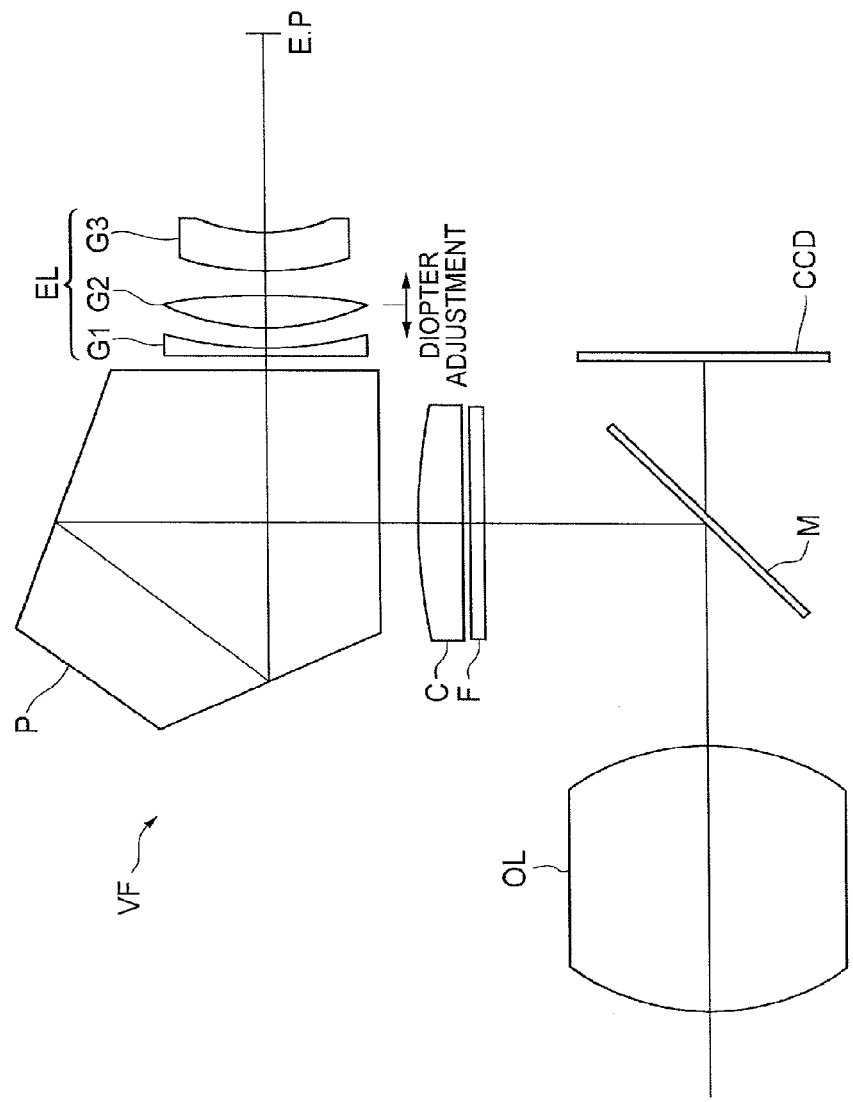

(EXAMPLE 4)

(EXAMPLE 5)

(EXAMPLE 7)

(REFERENCE EXAMPLE)

EYEPIECE LENS, VIEWFINDER OPTICAL SYSTEM AND OPTICAL APPARATUS EQUIPPED WITH THE SAME, AND METHOD FOR MANUFACTURING EYEPIECE LENS

This is a continuation of PCT International Application No. PCT/JP2012/008184, filed on Dec. 21, 2012, which is hereby incorporated by reference. This application also claims the benefit of Japanese Patent Application No. 2011-289183, filed in Japan on Dec. 28, 2011, which is hereby incorporated by reference.

TECHNICAL FIELD

The present invention relates to an eyepiece lens, and more particularly to an eyepiece lens that is used for a single-lens reflex finder.

TECHNICAL BACKGROUND

A single-lens reflex viewfinder is a real image type viewfinder used to view a real image of an image capturing lens using an eyepiece lens having positive refractive power, and in a standard configuration thereof, an inverted image of the image capturing lens is erected using a front surface mirror called a "quick return mirror" and a pentagonal roof prism, and is viewed using an eyepiece lens constituted by an achromatic positive lens. In order to improve usability for the user, high viewing magnification and a diopter adjustment function are demanded for a single-lens reflex viewfinder. Moreover, considering use in a dark place and the deviation between the eye of the user and the exit pupil of the eyepiece, the single-lens reflex viewfinder is also demanded to ensure a wide pupil of which aberrations are satisfactorily corrected to approximately ɸ10 mm at eye point.

To increase the viewing magnification, the focal length of the eyepiece lens must be decreased. However, the diopter must be set to around −1 [m⁻¹], hence a substantial focal length of the eyepiece lens is determined by the distance between the focal plane plate and the eyepiece lens. This means that in order to most simply increase the viewing magnification of the viewfinder, the optical path length of the penta prism is decreased, and the eyepiece lens is disposed close to the penta prism. On the other hand, in order to take a sufficiently long distance from the eye point side vertex of the eyepiece lens to the eye point (eye relief), the penta prism size must be increased so that shading on the exit surface of the penta prism is minimized. This makes the optical path length of the penta prism long, and drops the viewing magnification. In other words, there is a trade-off between an increase in the viewing magnification and taking a long eye relief.

A known eyepiece for viewing the image formation of an objective lens via an erecting system is used for a single-lens reflex camera, and includes, in order from the eye point, a negative lens group (first lens group), a positive lens group (second lens group) and a negative lens group (third lens group), wherein the refractive power of the second lens group and that of the third lens group are appropriately set, and the second lens group is moved along the optical axis so that various aberrations are satisfactorily corrected, the viewing magnification increases and diopter adjustment can be performed (e.g. see Patent Document 1). Recently these eyepiece lenses are even more strongly demanded not only to have good aberration performance but also to prevent ghosts and flares which are causes of diminished optical performance of a viewfinder, and therefore high performance is demanded for the antireflection coating formed on the lens surface as well, and in order to meet this demand, multilayer film design techniques and multilayer film deposition techniques are continuously advancing (e.g. see Patent Document 2).

PRIOR ARTS LIST

Patent Document

Patent Document 1: Japanese Laid-Open Patent Publication No. 2001-324684 (A)
Patent Document 2: Japanese Laid-Open Patent Publication No. 2000-356704 (A)

SUMMARY OF THE INVENTION

Problems to be Solved by the Invention

Recently along with the digitization of cameras, various electronic components, such as liquid crystal screens, are incorporated into cameras, with the distance from a picture element surface or a film surface to a rear end surface of a camera increasing. For the user to easily view through the viewfinder, a sufficiently long distance must be ensured between the eye point and the rear end surface of the camera, and for this, the eyepiece lens must be disposed near the rear end surface of the camera and a sufficient eye relief of the eyepiece lens must be ensured.

If the eyepiece lens is disposed near the rear end surface of the camera however, the distance from the focal plane plate to the eye piece lens becomes long, which makes it difficult to increase the viewing magnification. Further, if the eye relief of the eyepiece lens which is disposed near the rear end surface of the camera is sufficiently ensured, the size of the penta prism must be increased as mentioned above, then the optical path length (glass path length) of the penta prism increases and the distance between the focal plane plate to the eyepiece lens increases, which makes it even more difficult to increase the viewing magnification. In this way, ensuring high viewing magnification with a wide field of view is becoming very difficult as the digitization of cameras advances.

Another problem is that a reflected light that becomes ghosts or flares is easily generated from the optical surface of the eyepiece lens when the user is viewing an object with high brightness, such as a point light source, through the viewfinder, or when light enters the eyepiece lens from the eye point side.

With the foregoing in view, it is an object of the present invention to provide an eyepiece lens which allows diopter adjustment and has a large pupil diameter, yet can further decrease ghosts and flares and ensure relatively high viewing magnification with a wide field of view. It is another object of the present invention to provide a viewfinder optical system and an optical apparatus equipped with the eyepiece lens, and a method for manufacturing the eyepiece lens.

Means to Solve the Problems

To achieve these objects, an eyepiece lens according to the present invention is an eyepiece lens used for a viewfinder optical system for viewing, using the eyepiece lens, an image formed by an objective lens, an image displayed by a display member, or an object, wherein an antireflection coating is disposed on at least one surface among optical surfaces constituting the eyepiece lens, and the antireflection coating includes at least one layer formed by a wet process.

It is preferable that the eyepiece lens according to the present invention includes, in order from an object, a first lens group having negative refractive power, a second lens group having positive refractive power, and a third lens group having negative refractive power.

In the eyepiece lens according to the present invention, it is preferable that diopter adjustment can be performed by moving at least one of the first lens group, the second lens group and the third lens group along an optical axis.

In the eyepiece lens according to the present invention, it is preferable that the second lens group includes a biconvex lens component.

In the eyepiece lens according to the present invention, it is preferable that the third lens group includes a meniscus lens component having a convex surface facing the object.

In the eyepiece lens according to the present invention, it is preferable that the following conditional expression is satisfied.

$$Nn(ABE) > 1.870$$

where Nn (ABE) denotes an average value of refractive indexes, with respect to the d-line, of lenses having negative refractive power and included in the first lens group and the third lens group.

In the eyepiece lens according to the present invention, it is preferable that the following conditional expression is satisfied.

$$30.0 > \nu(ABE)$$

where ν (ABE) denotes an average value of Abbe numbers, with respect to the d-line, of lenses having negative refractive power and included in the first lens group and the third lens group.

In the eyepiece lens according to the present invention, it is preferable that the following conditional expression is satisfied.

$$\nu 2 > 40$$

where ν2 denotes an average value of Abbe numbers, with respect to the d-line, of lenses included in the second lens group.

In the eyepiece lens according to the present invention, it is preferable that at least one optical surface of the second lens group is aspherical.

In the eyepiece lens according to the present invention, it is preferable that the following conditional expression is satisfied.

$$S3 > 2.4$$

where S3 denotes a shape factor of a lens component located closest to an eye point in the third lens group (that is, a value defined by $(Ro_3+Re_3)/(Ro_3-Re_3)$, where $Ro_3$ denotes a radius of curvature of the object side surface of the lens component located closest to the eye point in the third lens group, and $Re_3$ denotes a radius of curvature of the eye point side surface of the lens component located closest to the eye point in the third lens group).

In the eyepiece lens according to the present invention, it is preferable that diopter adjustment can be performed by moving the second lens group along an optical axis.

In the eyepiece lens according to the present invention, it is preferable that antireflection coating is a multilayer film, and the layer formed by a wet process is an outermost surface layer among layers constituting the multilayer film.

In the eyepiece lens according to the present invention, it is preferable that the following conditional expression is satisfied.

$$nd \leq 1.30$$

where nd denotes a refractive index, with respect to the d-line, of the layer formed by the wet process.

In the eyepiece lens according to the present invention, it is preferable that the optical surface on which the antireflection coating is formed is a lens surface which is concave when viewed from an eye point.

It is preferable that the eyepiece lens according to the present invention includes, in order from an object, a first lens group having negative refractive power, a second lens group having positive refractive power, and a third lens group having negative refractive power, wherein the optical surface on which the antireflection coating is formed is a lens surface which is concave when viewed from an eye point.

In the eyepiece lens according to the present invention, it is preferable that the lens surface which is concave when viewed from the eye point is a lens surface closest to the object among the optical surfaces of the first lens group to the third lens group.

In the eyepiece lens according to the present invention, it is preferable that the lens surface which is concave when viewed from the eye point is a lens surface closest to an image plane among the optical surfaces of the first lens group to the third lens group.

In the eyepiece lens according to the present invention, it is preferable that the optical surface on which the antireflection coating is formed is a lens surface which is concave when viewed from an object.

It is preferable that the eyepiece lens according to the present invention includes, in order from an object, a first lens group having negative refractive power, a second lens group having positive refractive power, and a third lens group having negative refractive power, wherein the optical surface on which the antireflection coating is formed is a lens surface which is concave when viewed from the object.

In the eyepiece lens according to the present invention, it is preferable that the concave lens surface on which the antireflection coating is formed is a lens surface closest to an image plane among the optical surfaces of the second lens group.

In the eyepiece lens according to the present invention, it is preferable that the optical surface on which the antireflection coating is formed is an optical surface other than the optical surface closest to an eye point.

A viewfinder optical system according to the present invention is for viewing an image formed by an objective lens, using an eyepiece lens, wherein the eyepiece lens is an eyepiece lens that is one of the above mentioned eyepiece lenses.

An optical apparatus according to the present invention includes a viewfinder optical system for viewing an image formed by an objective lens, using an eyepiece lens, wherein the viewfinder optical system is the above mentioned viewfinder optical system.

A method for manufacturing an eyepiece lens according to the present invention is a method for manufacturing an eyepiece lens used for a viewfinder optical system for viewing, using the eyepiece lens, an image formed by an objective lens, an image displayed by a display member, or an object, the method comprising steps of: disposing an antireflection coating, which includes at least one layer formed by a wet process, on at least one surface among optical surfaces constituting the eyepiece lens; and disposing the lens having the optical surface on which the antireflection coating is formed, in a lens barrel.

In the method for manufacturing an eyepiece lens according to the present invention, it is preferable that the eyepiece lens includes, in order from the object, a first lens group having negative refractive power, a second lens group having positive refractive power, and a third lens group having negative refractive power.

In the method for manufacturing an eyepiece lens according to the present invention, it is preferable that the following conditional expression is satisfied.

$$nd \leq 1.30$$

where nd denotes a refractive index, with respect to the d-line, of the layer formed by the wet process.

In the method for manufacturing an eyepiece lens according to the present invention, it is preferable that the optical surface on which the antireflection coating is formed is a lens surface which is concave when viewed from an eye point.

Advantageous Effects of the Invention

According to the present invention, an eyepiece lens which allows diopter adjustment and has a large pupil diameter, yet can further reduce ghosts and flares and ensure a relatively high viewing magnification with a wide field of view, can be provided. Moreover, a viewfinder optical system and an optical apparatus equipped with the eyepiece lens, and a method for manufacturing the eyepiece lens, can be provided.

BRIEF DESCRIPTION OF THE DRAWINGS

FIG. 1 is a diagram depicting a configuration of an eyepiece lens according to Example 1;

FIGS. 2A to 2C are graphs showing various aberrations (spherical aberration, astigmatism, coma aberration and distortion) of the eyepiece lens according to Example 1, where FIG. 2A is a set of graphs showing various aberrations when the diopter is −1 [m$^{-1}$], FIG. 2B is a set of graphs showing various aberrations when the diopter is −3 [m$^{-1}$], and FIG. 2C is a set of graphs showing various aberrations when the diopter is +1 [m$^{-1}$];

FIG. 3 is a cross-sectional view depicting a lens configuration of the eyepiece lens according to Example 1 for explaining an example of a state, where a beam entered from the eye point side is reflected on a first reflected light generation surface;

FIG. 5 is a diagram depicting a configuration of an eyepiece lens according to Example 2;

FIGS. 6A to 6C are graphs showing various aberrations (spherical aberration, astigmatism, coma aberration and distortion) of the eyepiece lens according to Example 2, where FIG. 6A is a set of graphs showing various aberrations when the diopter is −1 [m$^{-1}$], FIG. 6B is a set of graphs showing various aberrations when the diopter is −3 [m$^{-1}$], and FIG. 6C is a set of graphs showing various aberrations when the diopter is +1 [m$^{-1}$];

FIG. 7 is a diagram depicting a configuration of an eyepiece lens according to Example 3;

FIGS. 8A to 8C are graphs showing various aberrations (spherical aberration, astigmatism, coma aberration and distortion) of the eyepiece lens according to Example 3, where FIG. 8A is a set of graphs showing various aberrations when the diopter is −1 [m$^{-1}$], FIG. 8B is a set of graphs showing various aberrations when the diopter is −3 [m$^{-1}$], and FIG. 8C is a set of graphs showing various aberrations when the diopter is +1 [m$^{-1}$];

FIG. 9 is a schematic diagram depicting a configuration of a single-lens reflex camera equipped with the eyepiece lens and the viewfinder optical system according to Embodiment 1;

DESCRIPTION OF THE EMBODIMENTS

Figure 2B:
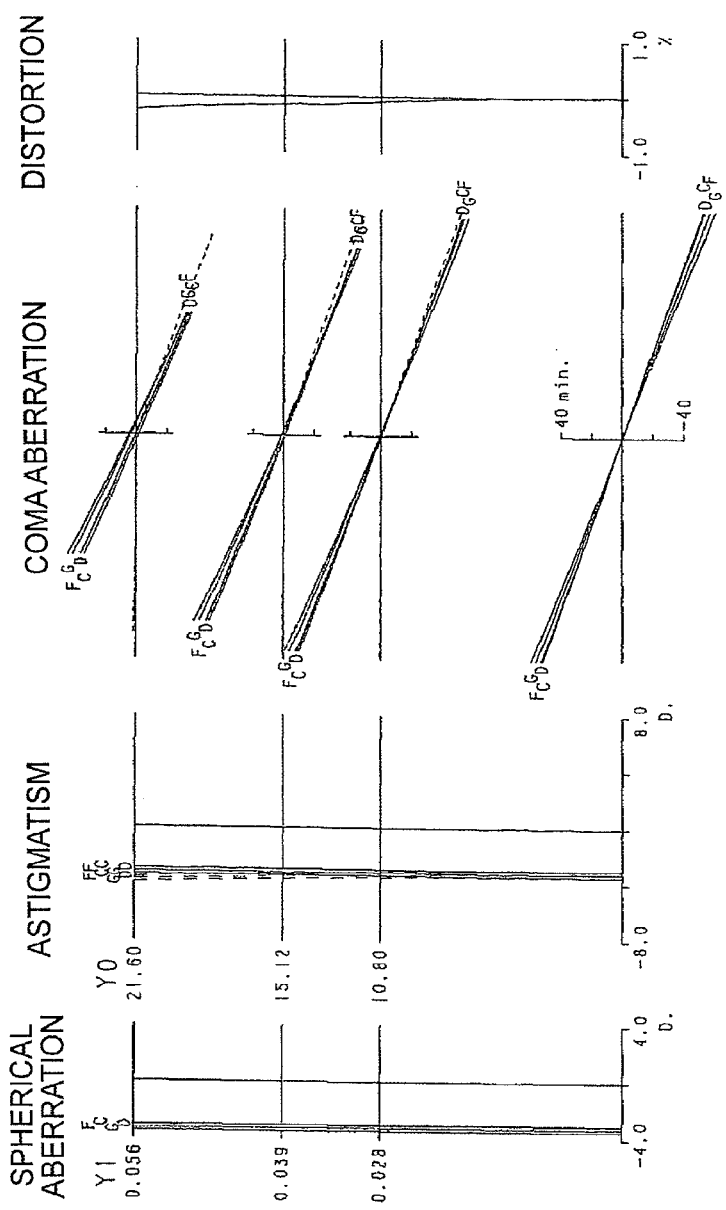

Embodiments of the present invention will now be described with reference to the drawings. Embodiment 1 of the present invention will be described first with reference to FIG. 1 to FIG. 16. Then Embodiment 2 and Embodiment 3 of the present invention will be described with reference to FIG. 17 to FIG. 29.

Embodiment 1

FIG. 9 shows a single-lens reflex camera CAM equipped with an eyepiece lens EL and a viewfinder optical system VF according to Embodiment 1. The single-lens reflex camera CAM includes an objective lens OL, a mirror M, a picture element CCD for capturing an image, and a viewfinder optical system VF. The viewfinder optical system VF includes, in order from an object, a focal plane plate F, a condenser lens C, a penta prism P and an eyepiece lens EL, so that an image formed on the focal plane plate F by the objective lens OL can be viewed by the eyepiece lens EL. An eye point E.P is set behind the eyepiece lens EL.

The objective lens OL forms an object image on the picture element CCD or on the focal plane plate F. The mirror M is inserted at a 45° angle from the optical axis that passes through the objective lens OL. Therefore normally (photographing standby state) the light from the object (not illustrated) that passed through the objective lens OL is reflected, so as to form the image on the focal plane plate F, and at shutter release, the mirror M moves up (mirror up state) so that the light from the object (not illustrated), that passed through the objective lens OL, forms an image on the picture element CCD. In other words, the picture element CCD and the focal plane plate F are disposed in optically conjugate positions.

The penta prism P vertically and horizontally inverts the object image (inverted image) on the focal plane plate F formed by the object lens OL so that the object image is converted into an erected image. The penta prism P not only allows the user to view the object image as an erected image, but also makes the viewfinder optical system VF compact. The condenser lens C is disposed between the focal plane plate F and the penta prism P, so as to guide the object image on the focal plane plate F to the penta prism P. The condenser lens C has positive refractive power to suppress divergence of the beam, and is disposed near the image formation position where the object image is formed by the objective lens OL (e.g. in this embodiment, between the focal plane plate F and the penta prism P), in order to prevent the erecting optical system or the eyepiece optical system from becoming large, because the beam spreads wider with increasing distance from the objective lens OL.

The eyepiece lens EL includes, in order from the object, a first lens group G1 having negative refractive power, a second lens group G2 having positive refractive power, and a third lens group G3 having negative refractive power, where the diopter can be adjusted by moving the second lens group G2 along the optical axis, and the second lens group G2 has a biconvex lens component L2. The third lens group G3 has a meniscus lens component L3 which has a convex surface facing the object, and has negative refractive power. In this embodiment, the meniscus lens component L3 constituting the third lens group G3 is positioned closest to the eye point E.P in the third lens group G3.

If the third lens group G3 includes the meniscus lens component L3 which has negative refractive power and has a convex surface facing the object, a predetermined viewing magnification can be ensured while taking sufficient eye relief.

A high refractive index material of which refractive index with respect to the d-line is high is known. For example, if an average value n1 of the refractive indexes of lenses having negative refractive power and included in the first lens group G1 is small, the radius of curvature of the lenses included in the first lens group G1 tends to be small, and as a result, the distortion and the curvature of field tend to deteriorate. If an average value n3 of refractive indexes of lenses having negative refractive power included in the third lens group G3 is low, the radius of curvature of the lenses included in the third lens group G3 tends to be small, and as a result, the spherical aberration and the coma aberration tend to deteriorate. Therefore the average value n1 or n3 of the refractive indexes of the lenses having negative refractive power included in the first lens group G1 or the third lens group G3 is set to high respectively, then the radius of curvature of the lenses having negative refractive power included in the lens group G1 or G3 can be increased while provided high refractive power to the first lens group G1 or the third lens group G3 respectively, and as a result, the distortion, the curvature of field, the spherical aberration and the coma aberration can be corrected satisfactorily.

The eyepiece lens EL according to this embodiment satisfies the following conditional expression (1).

$$Nn(ABE) > 1.870 \qquad (1)$$

where Nn (ABE) denotes an average value of refractive indexes, with respect to the d-line, of the lenses having negative refractive power included in the first lens group G1 and the third lens group G3.

In the eyepiece lens EL according to this embodiment, by increasing the average value of refractive indexes, with respect to the d-line, of the lenses having negative refractive power included in the first lens group G1 and the third lens group G3 so as to satisfy the conditional expression (1), the Petzval sum, which tends to increase when a high refractive index material is used for at least one of the lenses having negative refractive power included in the first lens group G1 or the third lens group G3, can be optimized, and as a result, the curvature of field can be corrected even more satisfactorily. In other words, in the eyepiece lens EL according to this embodiment, the average value of the refractive indexes, with respect to the d-line, of the lenses having negative refractive power included in the first lens group G1 and the third lens group G3 is increased so as to satisfy the conditional expression (1), instead of simply increasing the average value n1 or n3 of the refractive indexes, with respect to the d-line, of the lenses having negative refractive power included in the first lens group G1 or the third lens group G3, therefore the Petzval sum is optimized and the curvature of field can be corrected satisfactorily.

If the lower limit value of the conditional expression (1) is 1.875, the effect of this embodiment can be further demonstrated.

If the average value of the refractive indexes of the lenses having negative refractive power included in the first lens group G1 and the third lens group G3 satisfies the conditional expression (1), and the average value n1 of the refractive indexes of the lenses having negative refractive power included in the first lens group G1 and the average value n3 of the refractive indexes of the lenses having negative refractive power included in the third lens group G3 are increased (e.g. n1>1.83, n2>1.83), then the distortion, the curvature of field, the spherical aberration and the coma aberration can be corrected, and even better optical performance can be obtained.

If the radius of curvature is small, the lens having positive refractive power included in the second lens group G2 must have a thick lens thickness in order to ensure an outer diameter, but if glass with high refractive index is used, the lens can be thinner than a conventional product. By making the lens thinner, the distance between the exit plane of the penta prism P and the eye point E.P can be decreased, and high viewing magnification can be ensured.

In this embodiment, it is preferable that the average value of the refractive indexes with respect to the d-line of the positive lenses included in the second lens group G2 is 1.75 or more.

If at least one optical surface of the second lens group G2 is aspherical here, the spherical aberration can be corrected even more satisfactorily. Particularly if the object side optical surface of the biconvex lens component of the second lens group G2 is aspherical, the aspherical surface can be utilized effectively, hence the spherical aberration and the coma aberration can be corrected satisfactorily at each diopter during the diopter adjustment, and fluctuation of aberration during the diopter adjustment can be controlled.

In the eyepiece lens EL according to this embodiment, the diopter adjustment is performed by moving the second lens group G2 along the optical axis, therefore fluctuation of aberration (particularly fluctuation of aspherical aberration) caused by moving the lenses during the diopter adjustment can be minimized.

In the eyepiece lens EL according to this embodiment, an antireflection coating is formed on at least one surface out of the optical surface constituting the eyepiece lens, and the antireflection coating includes at least one layer formed by a wet process. By this configuration, the eyepiece lens EL according to this embodiment can reduce ghosts and flares that are generated by the light from the object side or the eye point E.P side that is reflected on the optical surface, and can implement a high image forming performance.

In the eyepiece lens EL according to this embodiment, it is preferable that the antireflection coating is a multilayer film, and the layer formed by the wet process is the outermost surface layer among the layers constituting the multilayer film. Then the difference of the reflective index from air can be decreased, and the reflection of light can be further decreased, which allows further reducing ghosts and flares.

In the eyepiece lens EL according to this embodiment, it is preferable that the following conditional expression is satisfied.

$$nd \leq 1.30$$

where nd denotes a refractive index, with respect to the d-line, of the layer of the antireflection coating formed by the wet process.

By satisfying this conditional expression, the difference of indexes between the layer of the antireflection coating formed by the wet process and the air can be decreased, and the reflection of light can be further decreased, which allows further reducing ghosts and flares.

In the eyepiece lens EL according to this embodiment, it is preferable that the optical surface on which the antireflection coating is formed, among the optical surfaces of the first lens group G1 to the third lens group G3, is a lens surface which is concave when viewed from the eye point E.P. By forming the antireflection coating on the optical surface where reflected light is easily generated, ghosts and flares can be effectively reduced.

In the eyepiece lens EL according to this embodiment, it is preferable that the lens surfaces on which the antireflection coating is formed and which is concave when viewed from the eye point E.P, among the optical surfaces of the first lens group G1 to the third lens group G3, is a lens surface closest to the object. By forming the antireflection coating on the optical surface where reflected light is easily generated, ghosts and flares can be effectively reduced.

In the eyepiece lens EL according to this embodiment, it is preferable that the lens surface on which the antireflection coating is formed and which is concave when viewed from the eye point E.P, among the optical surfaces of the first lens group G1 to the third lens group G3, is a lens surface closest to the image plane. By forming the antireflection coating on the optical surface where reflected light is easily generated, ghosts and flares can be effectively reduced.

In the eyepiece lens EL according to this embodiment, it is preferable that the optical surface on which the antireflection coating is formed, among the optical surfaces of the first lens group G1 to the third lens group G3, is a lens surface which is concave when viewed from the object. By forming the antireflection coating on the optical surface where reflected light is easily generated, ghosts and flares can be effectively reduced.

In the eyepiece lens EL according to this embodiment, it is preferable that the lens surface on which the antireflection coating is formed and which is concave when viewed from the object, is a lens surface closest to the image plane among the optical surfaces of the second lens group G2. By forming the antireflection coating on the optical surface where reflected light is easily generated, ghosts and flares can be effectively reduced.

In the eyepiece lens EL according to this embodiment, the antireflection coating may be formed by a dry process, instead of the wet process. In this case, it is preferable that the antireflection coating includes at least one layer of which refractive index with respect to the d-line is 1.30 or less. By including at least one layer of which refractive index with respect to the d-line is 1.30 or less, the same effect as forming the antireflection coating by the wet process can be demonstrated, even if the dry process is used. It is preferable that the layer of which refractive index with respect to the d-line is 1.30 or less is an outermost surface layer among the layers constituting the multilayer film.

In the eyepiece lens EL according to this embodiment, it is preferable that the following conditional expression (2) is satisfied.

$$30.0 > v(ABE) \tag{2}$$

where v (ABE) denotes an average value of Abbe numbers, with respect to the d-line, of lenses having negative refractive power and included in the first lens group G1 and the third lens group G3.

By satisfying the conditional expression (2), chromatic aberration, specifically, both lateral chromatic aberration and longitudinal chromatic aberration in this embodiment, generated in the second lens group G2 due to the first lens group G1 and the third lens group G3, can be sufficiently corrected. If the upper limit value of the conditional expression (2) is exceeded, the lateral chromatic aberration generated in the second lens group G2 due to the first lens group G1 and the third lens group G3 cannot be sufficiently corrected.

If the upper limit value of the conditional expression (2) is set to 29.5, the effect of this embodiment can be further demonstrated. And if the upper limit value of the conditional expression (2) is 29.0, the effect of this embodiment can be even further demonstrated.

It is even more preferable that the second lens group G2 satisfies the following conditional expression (3) in a state when the first lens group G1 and the third lens group G3 satisfy the conditional expression (2).

$$v2 > 40 \tag{3}$$

where ν2 denotes an average value of Abbe numbers, with respect to the d-line, of lenses included in the second lens group G2.

By satisfying the conditional expression (3), both the lateral chromatic aberration and the longitudinal chromatic aberration generated in the second lens group G2 can be suppressed. If the lower limit value of the conditional expression (3) is not reached, load is applied to the first lens group G1, and the distortion and the curvature of field corrected in the first lens group G1 deteriorate, which is not desirable.

In the eyepiece lens EL according to this embodiment, it is preferable that the third lens group G3 satisfies the following conditional expression (4), in order to secure increase the viewing magnification while ensuring sufficient eye relief.

$$S3 > 2.4 \qquad (4)$$

Here S3 denotes a shape factor of a lens component located closest to the eye point E.P in the third lens group G3, and is defined by the conditional expression S3=(Ro3+Re3)/(Ro3−Re3). Ro3 denotes a radius of curvature of the object side surface of the lens component located closest to the eye point E.P in the third lens group G3, and Re3 denotes a radius of curvature of the eye point E.P side surface of the lens component closest to the eye point E.P in the third lens group G3.

The conditional expression (4) specifies the shape of the lens component located closest to the eye point E.P in the third lens group G3 (in this embodiment, the meniscus lens component L3 corresponds to this lens component). Generally it is more advantageous to increase the viewing magnification as the negative refractive index of the lens component becomes stronger. However in order to execute diopter adjustment, the negative refractive power of the first lens group G1 must be strong. Therefore the lens component located closest to the eye point E.P in the third lens group G3 has a thick lens thickness with lower negative refractive power, and has a shape that satisfies the conditional expression (4), so that the object side surface of this lens component functions positively to marginal light, and the surface on the eye point E.P side functions negatively to marginal light. Thereby the principal points are set to the eye point E.P side, the distance between the principal points is widened, and the viewing magnification is increased. Marginal light refers to the rays most distant from the optical axis among the rays of which image height is zero.

Further, considering the locus of light from the eye point E.P, the lens component located closest to the eye point E.P in the third lens group G3 can transmit diagonal light from the eye point E.P to the second lens group G2 without significantly refracting the light, therefore the ray height on the exit surface of the penta prism P can be kept low while preventing shading, which allows the penta prism P to be compact. The shape that satisfies the conditional expression (4) can also make it easy to ensure the eye relief.

If the lower limit value of the conditional expression (4) is 3.4, the effect of this embodiment can be further demonstrated. And if the lower limit value of the conditional expression (4) is 4.0, the effect of this embodiment can be even further demonstrated.

In the single-lens reflex camera CAM having the above configuration, the light from an object (not illustrated) transmits through the objective lens OL and is reflected by the mirror M toward the focal plane plate F, and forms an image of the object on the focal plane plate F. In the viewfinder optical system VF, the beam from the object image on the focal plane plate F transmits through the condenser lens C, the penta prism P and the eyepiece lens EL, and is guided to the eye point E.P, and the user can view the real image of the object (not illustrated) at the eye point E.P. At shutter release, the mirror M moves up and the light from the object (not illustrated), that transmitted through the objective lens OL, forms the image on the picture element CCD.

Figure 10:
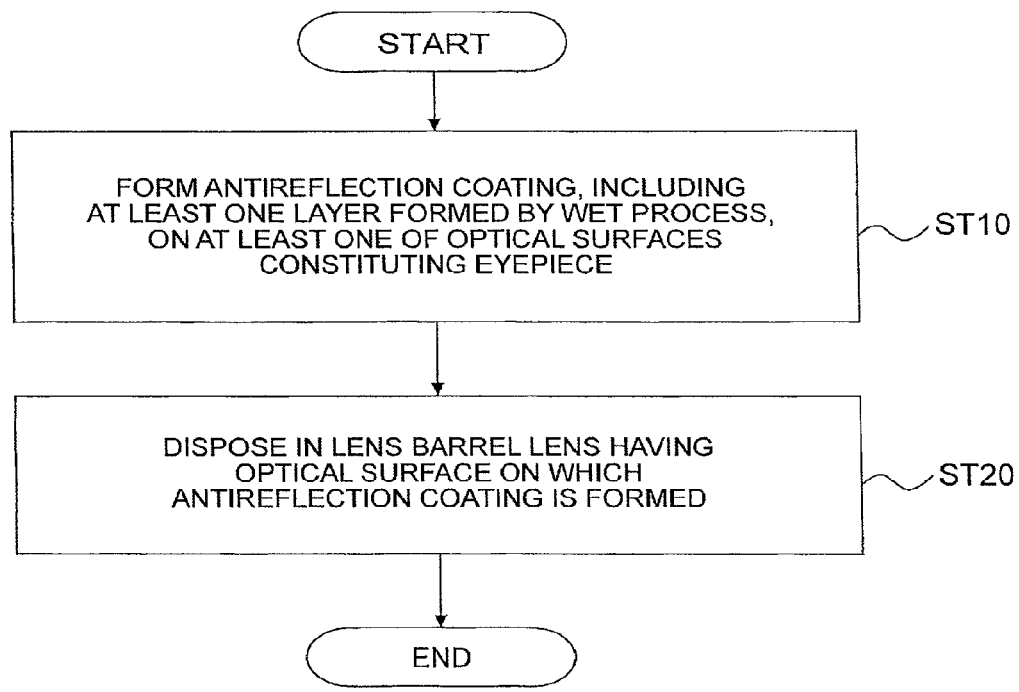
FIG. 10 is a flow chart depicting a method for manufacturing the eyepiece lens according to Embodiment 1.

Now a method for manufacturing the eyepiece lens EL will be described with reference to FIG. 10. The method for manufacturing the eyepiece lens is suitable not only for the eyepiece lens used for the viewfinder optical system for viewing an image formed by the objective lens as described above, but also for an eyepiece lens used for a viewfinder optical system for viewing an image displayed by a later mentioned display member (e.g. liquid crystal) or an object. First the antireflection coating including at least one layer formed by the wet process is formed on at least one surface, among the optical surfaces constituting the eyepiece lens EL (step ST10). Then each lens, including the lens(es) having an optical surface on which the antireflection coating is formed, is disposed in a lens barrel (step ST20).

According to the method for manufacturing the eyepiece lens according to this embodiment, an eyepiece lens which allows diopter adjustment and has a large pupil diameter, yet can further reduce ghosts and flares and ensure a relatively high viewing magnification with a wide field of view, can be provided. Moreover, a viewfinder optical system and an optical apparatus equipped with the eyepiece lens can be provided.

Each example of the eyepiece lens according to Embodiment 1 will now be described with reference to the accompanying drawings.

Each reference symbol in FIG. 1 according to Example 1 of this embodiment is denoted independently from other examples, in order to avoid complication generated by an increase in the number of reference symbols. Therefore composing elements denoted with a same reference symbol in the drawing of each example do not always have a same configuration.

The following Table 1 to Table 3 are tables of various data of Example 1 to Example 3 of the eyepiece lens according to this embodiment.

In [Lens Data] in each table, a surface number indicates a sequence of an optical surface from the object side along the light traveling direction, with the focal plane formed on the focal plane plate F as 1, R denotes a radius of curvature of each optical surface (minus indicates that the surface is concave when viewed from the object side), d denotes a surface distance from each optical surface to the next optical surface on the optical axis, n(d) denotes a refractive index of the glass material used for the lens, with respect to the d-line (wavelength: 587.6 nm), and νd denotes an Abbe number of the glass material used for the lens with respect to the d-line. If a lens surface is aspherical, "*" is attached to the surface number and the paraxial radius of curvature is written in the column of the radius of curvature R. "∞" in the column of radius of curvature indicates a plane, and E.P indicates an eye point. The refractive index of air "1.00000" is omitted. In [Variable Distance Data], f denotes a focal length of the entire system of the eyepiece lens EL, and di (i is an integer) denotes a variable surface distance of surface i. [Conditional Expression] indicates a value corresponding to each conditional expression.

In [Aspherical Data] in each table, a form of the aspherical surface indicated by "*" in [Lens Data] is given by the following expression (a), where y denotes a height in a direction perpendicular to the optical axis, S(y) denotes a distance (sag) along the optical axis from a tangential plane at the vertex of the aspherical surface to a position on the aspherical surface at the height y, R denotes a radius of curvature (paraxial radius of curvature) of the reference spherical surface, κ denotes a conical coefficient, and An denotes an aspherical coefficient to degree n. E–n indicates× $10^{-n}$. For example, $1.234E-05=1.234\times10^{-5}$.

$$S(y)=(y^2/R)/\{1+(1-\kappa\cdot y^2/R^2)^{1/2}\}+A4xy^4+A6xy^6+A8xy^8 \quad (a)$$

"mm" is used as the unit of focal length f, radius of curvature R, surface distance d and other lengths in each table. However unit is not limited to "mm", and another appropriate unit may be used since an equivalent optical performance is obtained even if an optical system is proportionally expanded or proportionally reduced.

The unit of the diopter in each table is $[m^{-1}]$. For example, diopter X $[m^{-1}]$ indicates a state where an image by the eyepiece lens EL is formed at a position of 1/X [m(meter)] from the eye point E.P on the optical axis. The sign at this time is negative when the image is formed on the object side from the eye point E.P.

The description on the tables are the same for other examples, and are therefore omitted hereinbelow.

Example 1

Example 1 will be described with reference to FIG. 1 to FIG. 4 and Table 1. FIG. 1 shows a lens configuration (when diopter is –1 $[m^{-1}]$) of an eyepiece lens EL (EL1) according to Example 1. In FIG. 1, a penta prism P is shown in a state where the prism is developed into a thick plane parallel plate, and as a focal plane plate F, only a focal plane I, which is formed on the focal plane plate F, is illustrated.

The eyepiece lens EL1 according to Example 1 includes, in order from the object, a first lens group G1 having negative refractive power, a second lens group G2 having positive refractive power, and a third lens group G3 having negative refractive power, where the diopter adjustment can be performed by moving the second lens group G2 along the optical axis. The first lens group G1 includes a meniscus lens L1 having a convex surface facing the object, the second lens group G2 includes a biconvex lens L2, and the third lens group G3 includes a meniscus lens L3 having a convex surface facing the object.

In this example, a condenser lens C, located near the focal plane I, and the penta prism P are disposed between the focal plane I and the first lens group G1, along the optical axis, in order from the real image plane of an objective lens (not illustrated), that is, in order from the focal plane I.

In the eyepiece EL1 having the above configuration according to Example 1, an image on the focal plane I (formed by the objective lens which is not illustrated) is converted into an erect image via the condenser lens C and the penta prism P sequentially, is then enlarged by the eyepiece lens EL1 constituted by the first lens group G1 to the third lens group G3, and is viewed at the eye point E.P.

In the eyepiece lens EL1 according to Example 1, an antireflection coating, which is described later, is formed on the image plane side lens surface (surface number 7 in Table 1) of the negative meniscus lens L1 of the first lens group G1, and the object side lens surface (surface number 8 in Table 1) of the biconvex positive lens L2 of the second lens group G2.

Table 1 shows the data values of the eyepiece lens EL1 according to Example 1. The surface numbers 1 to 11 in Table 1 correspond to the respective optical surfaces having the radius of curvatures R1 to R11 shown in FIG. 1.

TABLE 1

[Lens Data]

| Surface number | R | d | n(d) | vd |
|---|---|---|---|---|
| 1 | ∞ | 2.10 | | |
| 2 | ∞ | 4.70 | 1.56883 | 56.34 |
| 3 | –65.035 | 1.30 | | |
| 4 | 0.000 | 110.53 | 1.51680 | 64.10 |
| 5 | 0.000 | 0.35 | | |
| 6 | 501.286 | 1.10 | 1.84666 | 23.78 |
| 7 | 44.978 | d7(variable) | | |
| *8 | 26.575 | 5.40 | 1.77387 | 47.25 |
| 9 | –115.804 | d9(variable) | | |
| 10 | 27.617 | 5.00 | 1.90366 | 31.27 |
| 11 | 19.001 | d11(variable) | | |
| E.P | | | | |

[Aspherical Data]

Surface 8   κ = 1.0000, A4 = –7.4129E–06, A6 = –7.2215E–09, A8 = 1.6391E–12

[Variable Distance Data]

| | Diopter | | |
|---|---|---|---|
| | –1 | –3 | +1 |
| f | 72.8 | 70.0 | 76.2 |
| d7 | 0.6 | 2.8 | 5.3 |
| d9 | 5.3 | 3.1 | 0.6 |
| d11 | 20.6 | 23.6 | 25.6 |

[Conditional Expressions]

Conditional expression (1) Nn(ABE) = 1.875
Conditional expression (2) ν(ABE) = 27.5
Conditional expression (3) ν2 = 47.3
Conditional expression (4) S3 = 5.42

As the data in Table 1 shows, the eyepiece lens EL1 according to Example 1 satisfies all the conditional expressions (1) to (4).

FIGS. 2A to 2C are graphs showing various aberrations of the eyepiece lens EL1 according to Example 1 (spherical aberration, astigmatism, coma aberration and distortion, in order from the left of page), where FIG. 2A is a set of graphs showing various aberrations when the diopter is –1 $[m^{-1}]$, and FIG. 2B is a set of graphs showing various aberrations when the diopter is –3 $[m^{-1}]$ and FIG. 2C is a set of graphs showing various aberrations when the diopter is +1 $[m^{-1}]$ respectively.

In each graph showing aberrations, Y1 denotes an incident height of the beam to the penta prism P, and Y0 denotes an object height on the focal plane I. In the graphs showing astigmatism, the solid line indicates the sagittal image surface, and the broken line indicates the meridional image surface. In the graphs showing coma aberration, "min" indicates a minute of the angle unit. In the graphs showing spherical aberration and in the graphs showing astigmatism, the unit of the abscissa is $[m^{-1}]$ respectively, which is indicated by "D" in the graphs. C denotes the C-line (wavelength: 656.3 nm), D denotes the d-line (wavelength: 587.6 nm), F denotes the F-line (wavelength: 486.1 nm), and G denotes the g-line (wavelength: 435.8 nm) in each aberration curve. The description on the graphs showing aberrations in Example 1 is the same for Examples 2 and 3, where this description is omitted.

As each graph showing aberrations clarifies, in Example 1, various aberrations of the optical system at each diopter are corrected satisfactorily, even if the optical path length of the viewfinder optical system VF is long and the diopter adjustment is possible. In Example 1, each graph showing various aberrations indicates aberrations when the pupil diameter of the eye point E.P is ϕ10 mm, and even in such a large pupil diameter, coma aberration, spherical aberration and distortion are corrected satisfactorily.

As a result, according to the eyepiece lens EL1 of Example 1, an eyepiece lens EL1 which allows diopter adjustment and has a large pupil diameter, yet can ensure a relatively high viewing magnification with a wide field of view, can be provided for the viewfinder optical system VF of a single-lens reflex camera CAM that uses a penta prism P, even if the distance between the focal plane plate F and the eyepiece lens EL1 is very long. Moreover, according to the viewfinder optical system VF and the single-lens reflex camera CAM (see FIG. 9) equipped with this eyepiece lens EL1, a relatively high viewing magnification with a wide field of view can be ensured while the diopter adjustment is possible and the pupil diameter is large, even if the distance between the focal plane plate F and the eyepiece lens EL1 is very long.

FIG. 3 shows an example of an eyepiece lens EL1 having the same configuration as Example 1, in a state where the beam, that entered from the eye point E.P side, is reflected on the first reflection surface, and generates ghosts and flares on the eye point E.P side.

In FIG. 3, if the beam BM from the eye point E.P enters the eyepiece lens EL as illustrated, the beam is reflected on the object side lens surface, of which radius of curvature is R8 (a surface where the first reflected light is generated, of which the surface number in Table 1 is 8) of the biconvex positive lens L2, reaches the eye point E.P, and generates ghosts and flares. The surface 8 where the first reflected light is generated is a lens surface which is concave when viewed from the eye point E.P. By forming an antireflection coating on this surface, which corresponds to the wide incident angle in a wider wavelength range, ghosts and flares can be effectively reduced.

Figure 4:
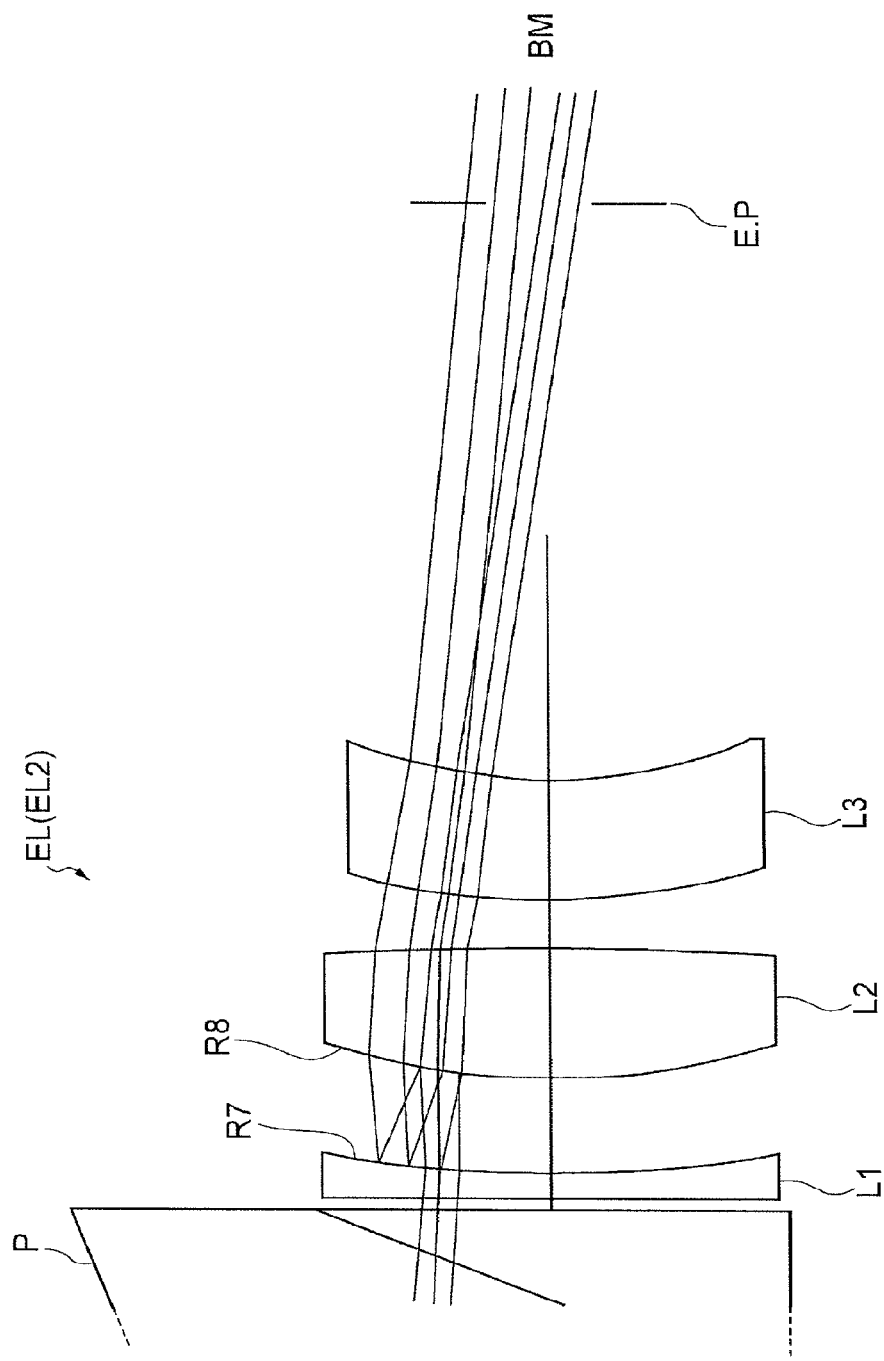
FIG. 4 is a cross-sectional view depicting the lens configuration of the eyepiece lens according to Example 1, for explaining an example of a state, where a beam entered from the object side is reflected on a first reflected light generation surface and a second reflected light generation surface.

FIG. 4 shows an example of an eyepiece lens EL1 having the same configuration as Example 1, in a state where the beam, that entered from the object side, is reflected on the first reflection surface and the second reflection surface, and generates ghosts and flares on the eye point E.P side.

In FIG. 4, if the beam BM from the object enters the eyepiece lens EL as illustrated, the beam is reflected on the object side lens surface, of which radius of curvature is R8 (a surface where the first reflected light is generated, of which the surface number in Table 1 is 8), of the biconvex positive lens L2, and the reflected light is reflected again on the image plane side lens surface, of which radius of curvature is R7 (a surface where the second reflected light is generated, of which the surface number in Table 1 is 7) of the negative meniscus lens L1, and reaches the eye point E.P and generates ghosts and flares. The surface R8, where the first reflected light is generated, is a lens surface which is concave when viewed from the eye point E.P. The surface R7, where the second reflected light is generated, is a lens system which is concave when viewed from the eye point E.P. By forming the antireflection coating on this surface, which corresponds to the wide incident angle in a wider wavelength range, ghosts and flares can be effectively reduced.

Example 2

Example 2 will be described with reference to FIG. 5, FIG. 6 and Table 2. FIG. 5 shows a lens configuration (when diopter is $-1$ [$m^{-1}$]) of an eyepiece lens EL (EL2) according to Example 2. In FIG. 5, a penta prism P is shown in a state where the prism is developed into a thick plane parallel plate, and as a focal plane plate F, only a focal plane I, which is formed on the focal plane plate F, is illustrated.

The eyepiece lens EL2 according to Example 2 includes, in order from the object, a first lens group G1 having negative refractive power, a second lens group G2 having positive refractive power, and a third lens group G3 having negative refractive power, where the diopter adjustment can be performed by moving the second lens group G2 along the optical axis. The first lens group G1 includes a meniscus lens L1 having a convex surface facing the object, the second lens group G2 includes a biconvex lens L2, and the third lens group G3 includes a meniscus lens L3 having a convex surface facing the object.

In this example, a condenser lens C located near the focal plane I and the penta prism P are disposed between the focal plane I and the first lens group G1, along the optical axis, in order from the real image plane of an objective lens (not illustrated), that is, in order from the focal plane I.

In the eyepiece lens EL2 having the above configuration according to Example 2, an image on the focal plane I (formed by the objective lens, which is not illustrated) is converted into an erected image via the condenser lens C and the penta prism P sequentially, is enlarged by the eyepiece lens EL2 constituted by the first lens group G1 to the third lens group G3, and is viewed at the eye point E.P.

In the eyepiece lens EL2 according to Example 2, an antireflection coating, which is described later, is formed on the image plane side lens surface (surface number 9 in Table 2) of the biconvex positive lens L2 of the second lens group G2, and on the object side surface (surface number 10 in Table 2) of the negative meniscus lens L3 of the third lens group G3.

Table 2 shows the data values of the eyepiece lens EL2 according to Example 2. The surface numbers 1 to 11 in Table 2 correspond to the respective optical surface having the radius of curvatures R1 to R11 in FIG. 5.

TABLE 2

[Lens Data]

| Surface number | R | d | n(d) | vd |
|---|---|---|---|---|
| 1 | ∞ | 2.00 | | |
| 2 | ∞ | 4.70 | 1.56883 | 56.34 |
| 3 | −65.035 | 1.30 | | |
| 4 | 0.000 | 110.53 | 1.51680 | 64.10 |
| 5 | 0.000 | 0.25 | | |
| 6 | 1159.197 | 2.82 | 2.00069 | 25.45 |
| 7 | 56.134 | d7(variable) | | |
| *8 | 27.121 | 5.40 | 1.75550 | 55.10 |
| 9 | −104.236 | d9(variable) | | |
| 10 | 25.552 | 4.93 | 1.90366 | 31.27 |
| 11 | 18.069 | d11(variable) | | |
| E.P | | | | |

[Aspherical Data]

Surface 8  κ = 0.4984, A4 = −4.6337E−06, A6 = −5.1922E−09, A8 = 1.1396E−11

TABLE 2-continued

[Variable Distance Data]

| | diopter | | |
|---|---|---|---|
| | −1 | −3 | +1 |
| f | 73.4 | 70.7 | 76.6 |
| d7 | 2.7 | 0.5 | 5.1 |
| d9 | 2.8 | 5.0 | 0.4 |
| d11 | 2.8 | 5.0 | 0.4 |

[Conditional Expressions]

Conditional expression (1) Nn(ABE) = 1.952
Conditional expression (2) ν(ABE) = 28.4
Conditional expression (3) ν2 = 55.1
Conditional expression (4) S3 = 5.83

As the data in Table 2 shows, the eyepiece lens EL2 according to Example 2 satisfies all the conditional expression (1) to (4).

Figure 6A:
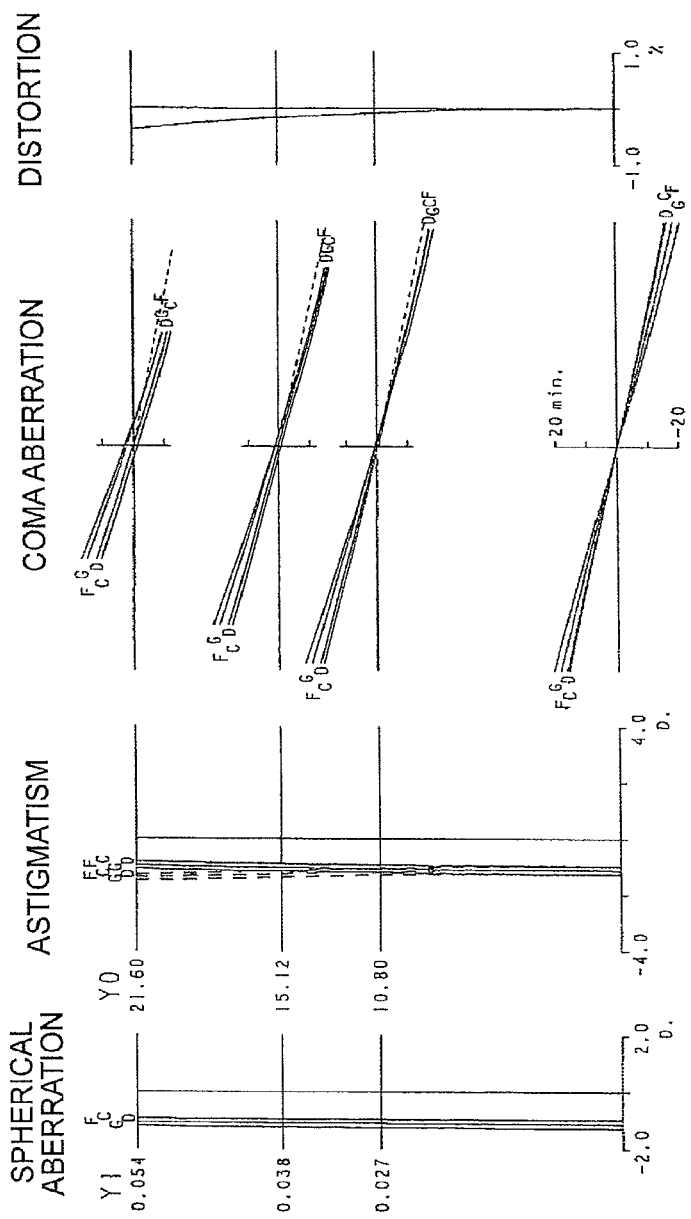

FIGS. 6A to 6C are graphs showing various aberrations of the eyepiece lens EL2 according to Example 2 (spherical aberration, astigmatism, coma aberration and distortion, in order from the left of page), where FIG. 6A is a set of graphs showing various aberrations when the diopter is −1 $[m^{-1}]$, FIG. 6B is a set of graphs showing aberrations when the diopter is −3 $[m^{-1}]$, and FIG. 6C is a set of graphs showing aberrations when the diopter is +1 $[m^{-1}]$ respectively. As each graph showing aberrations clarifies, in Example 2, various aberrations of the optical system at each diopter are corrected satisfactorily, even if the optical path length of the viewfinder optical system VF is long, and the diopter adjustment is possible. In Example 2, each graph showing various aberrations indicates aberrations when the pupil diameter of the eye point E.P is ϕ10 mm, and even in such a large pupil diameter, coma aberration, spherical aberration and distortion are corrected satisfactorily.

As a result, according to the eyepiece lens EL2 of Example 2, an eyepiece lens EL2 which allows diopter adjustment and has a large pupil diameter, yet can ensure a relatively high viewing magnification with a wide field of view, can be provided for the viewfinder optical system VF of a single-lens reflex camera CAM that uses a penta prism P, even if the distance between the focal plane plate F and the eyepiece lens EL2 is very long. Moreover, according to the viewfinder optical system VF and the single-lens reflex camera CAM (see FIG. 9) equipped with this eyepiece lens EL2, relatively high viewing magnification with a wide field of view can be ensured while the diopter adjustment is possible and the pupil diameter is large, even if the distance between the focal plane plate F and the eyepiece lens EL2 is very long.

Example 3

Example 3 will be described with reference to FIG. 7, FIG. 8 and Table 3. FIG. 7 shows a lens configuration (when diopter is −1 $[m^{-1}]$) of an eyepiece lens EL (EL3) according to Example 3. In FIG. 7, a penta prism P is shown in a state where the prims is developed into a thick plane parallel plate, and as a focal plane plate F, only a focal plane I, which is formed on the focal plane plate F, is illustrated.

The eyepiece lens EL3 according to Example 3 includes, in order from the object, a first lens group G1 having negative refractive power, a second lens group G2 having positive refractive power, and a third lens group G3 having negative refractive power, where the diopter adjustment can be performed by moving the second lens group G2 along the optical axis. The first lens group G1 includes a meniscus lens L1 having a convex surface facing the object, the second lens group G2 includes a biconvex lens L2, and the third lens group G3 includes a meniscus lens L3 having a convex surface facing the object.

In this example, a condenser lens C located near the focal plane I and the penta prim P are disposed between the focal plane I and the first lens group G1 along the optical axis, in order from the real image plane of an objective lens (not illustrated), that is, in order from the focal plane I.

In the eyepiece lens EL3 having the above configuration according to Example 1, an image on the focal plane I (formed by the objective lens which is not illustrated) is converted into an erected image via the condenser lens C and the penta prism P sequentially, is enlarged by the eyepiece lens EL3 constituted by the first lens group G1 to the third lens group G3, and is viewed at the eye point E.P.

In the eyepiece lens EL3 according to Example 3, an antireflection coating, which is described later, is formed on the object side lens surface (surface number 8 in Table 3) of the biconvex positive lens L2 of the second lens group G2, and on the image plane side lens surface (surface number 9 in Table 3) of the biconvex positive lens L2 of the second lens group G2.

Table 3 shows the data values of the eyepiece lens EL3 according to Example 3. The surface numbers 1 to 11 in Table 3 correspond to the respective optical surfaces having the radius of curvatures R1 to R11 in FIG. 7.

TABLE 3

[Lens Data]

| Surface number | R | d | n(d) | νd |
|---|---|---|---|---|
| 1 | ∞ | 2.10 | | |
| 2 | ∞ | 4.70 | 1.56883 | 56.34 |
| 3 | −65.035 | 1.30 | | |
| 4 | 0.000 | 110.53 | 1.51680 | 64.10 |
| 5 | 0.000 | 0.25 | | |
| 6 | 3941.586 | 1.10 | 2.00069 | 25.45 |
| 7 | 57.369 | d7(variable) | | |
| *8 | 28.042 | 5.32 | 1.77250 | 49.61 |
| 9 | −104.701 | d9(variable) | | |
| 10 | 25.668 | 4.90 | 2.00069 | 25.45 |
| 11 | 18.606 | d11(variable) | | |
| E.P | | | | |

[Aspherical Data]

Surface 8   κ = −0.1749, A4 = −5.2054E−07, A6 = −4.5613E−09,
            A8 = 1.2666E−11

[Variable Distance Data]

| | Diopter | | |
|---|---|---|---|
| | −1 | −3 | +1 |
| f | 70.4 | 72.9 | 75.9 |
| d7 | 0.6 | 2.8 | 5.2 |
| d9 | 5.2 | 3.0 | 0.6 |
| d11 | 24.0 | 26.0 | 28.0 |

[Conditional Expressions]

Conditional expression (1) Nn(ABE) = 2.001
Conditional expression (2) ν(ABE) = 25.5
Conditional expression (3) ν2 = 49.6
Conditional expression (4) S3 = 6.27

As the data in Table 3 shows, the eyepiece lens EL3 according to Example 3 satisfies all the conditional expressions (1) to (4).

Figure 8A:
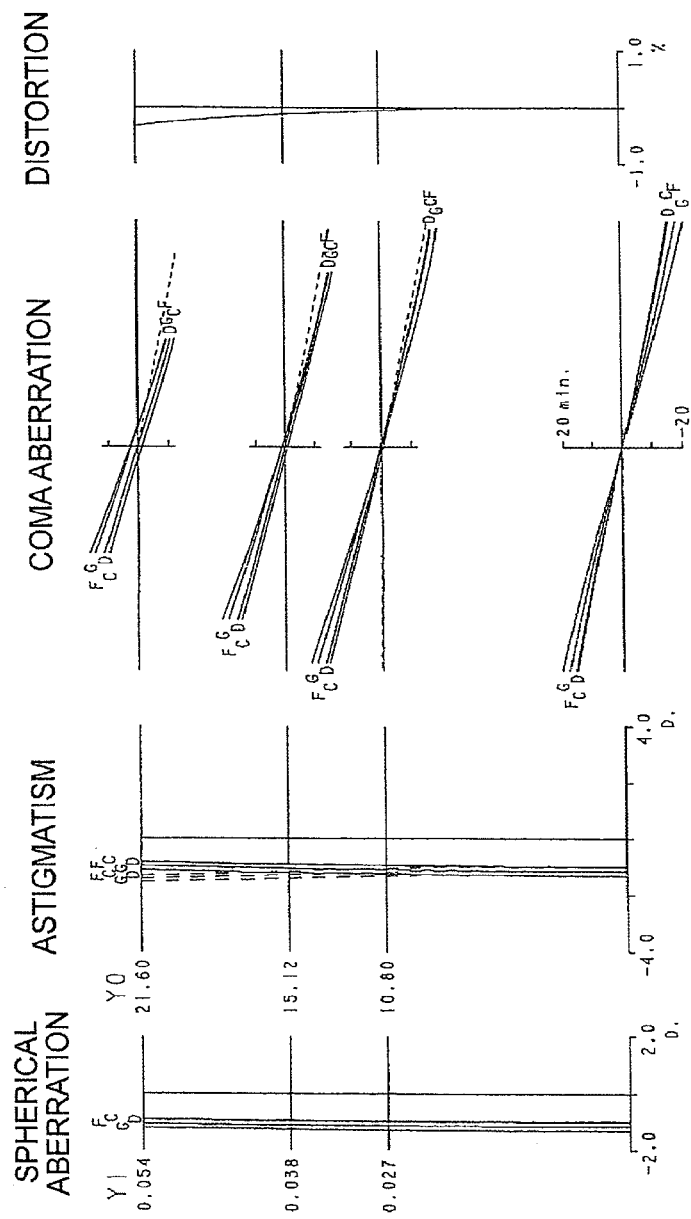
Figure 8B:
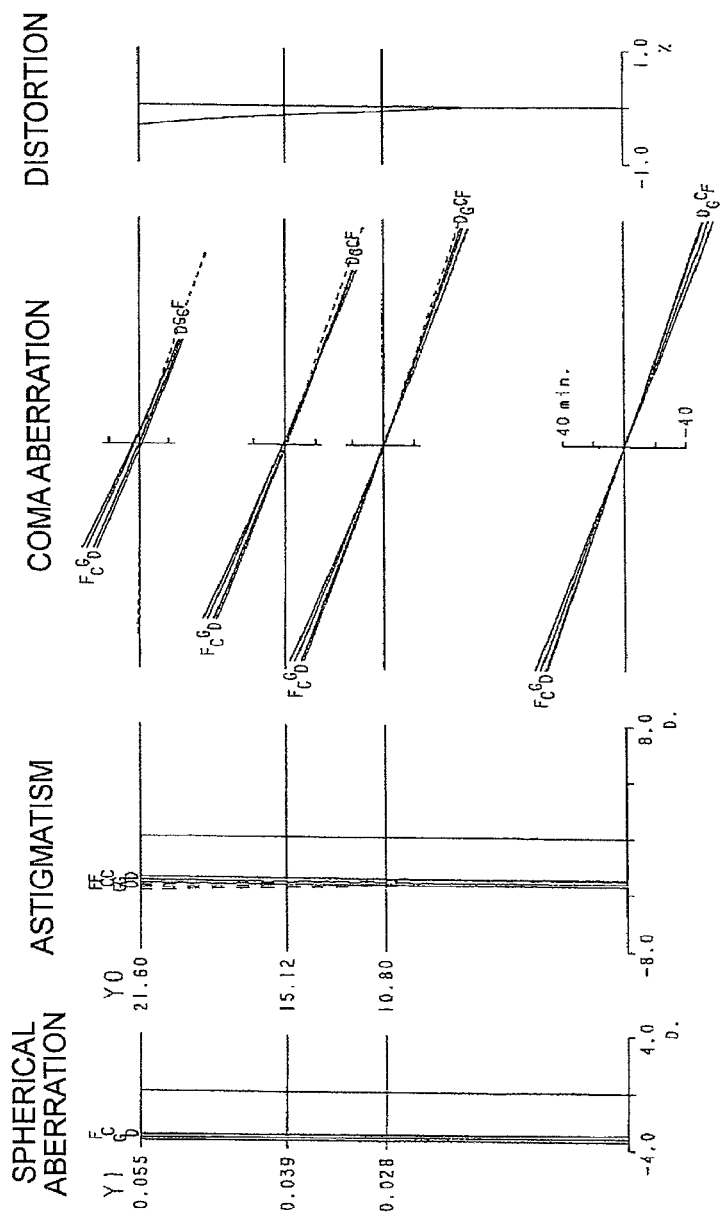

FIGS. 8A to 8C are graphs showing various aberrations of the eyepiece lens EL3 according to Example 3 (spherical aberration, astigmatism, coma aberration and distortion, in order from the left of page), where FIG. 8A is a set of graphs showing various aberrations when the diopter is −1 [m$^{-1}$], FIG. 8B is a set of graphs showing various aberrations when the diopter is −3 [m$^{-1}$], and FIG. 8C is a set of graphs showing various aberrations when the diopter is +1 [m$^{-1}$] respectively. As each graph showing aberrations clarifies, in Example 3, various aberrations of the optical system at each diopter are corrected satisfactorily, even if the optical path length of the viewfinder optical system VF is long, and the diopter adjustment is possible. In Example 3, each graph showing various aberrations indicates aberrations when the pupil diameter of the eye point E.P is φ10 mm, and even in such a large pupil diameter, coma aberration, spherical aberration and distortion are corrected satisfactorily.

As a result, according to the eyepiece lens EL3 of Example 3, an eyepiece lens EL3 which allows diopter adjustment and has a large pupil diameter, yet can ensure a relatively high viewing magnification with a wide field of view, can be provided for the viewfinder optical system VF of a single-lens reflex camera CAM that uses a penta prism P, even if the distance between the focal plane plate F and the eyepiece lens EL3 is very long. Moreover, according to the viewfinder optical system VF and the single-lens reflex camera CAM (see FIG. 9) equipped with this eyepiece lens EL3, a relatively high viewing magnification with a wide field of view can be ensured while diopter adjust is possible and the pupil diameter is large, even if the distance between the focal plane plate F and the eyepiece lens EL3 is very long.

Figure 11:
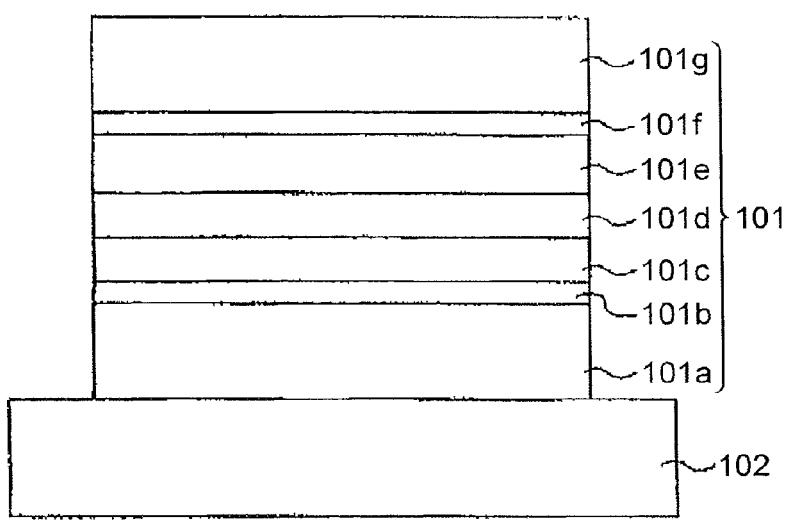
FIG. 11 is a diagram depicting an example of a layer structure of an antireflection coating.

Now the antireflection coating (also called "multilayer broadband antireflection coating") used for the eyepiece lens EL according to this embodiment will be described. FIG. 11 is a diagram depicting an example of a film configuration of the antireflection coating. This antireflection coating 101 is constituted by seven layers, and is formed on an optical surface of an optical member 102, such as a lens. A first layer 101a made of aluminum oxide is deposited by a vacuum deposition method. On the first layer 101a, a second layer 101b, made of a mixture of titanium oxide and zirconium oxide, is deposited by the vacuum deposition method. On the second layer 101b, a third layer 101c made of aluminum oxide is deposited by a vacuum deposition method, and on the third layer 101c, a fourth layer 101d made of a mixture of titanium oxide and zirconium oxide is deposited by the vacuum deposition method. Further, on the fourth layer 101d, a fifth layer 101e made of aluminum oxide is deposited by the vacuum deposition method, and on the fifth layer 101e, a sixth layer 101f made of a mixture of titanium oxide and zirconium oxide is deposited by the vacuum deposition method.

Then on the sixth layer 101f formed like this, a seventh layer 101g made of a mixture of magnesium fluoride and silica is formed by a wet process, thereby the antireflection coating 101 of this embodiment is formed. To form the seventh layer 101g, a sol-gel method, which is one type of wet process, is used. The sol-gel method involves converting sol obtained by mixing raw materials into a gel, which has no fluidity, by hydrolysis, a polycondensation reaction or the like, and obtaining a product by heating and decomposing the gel. To fabricate an optical thin film, sol of an optical thin film material is coated on the optical surface of the optical element, and a gel film is generated by drying and solidifying the sol. The wet process is not limited to the sol-gel method, but a method for obtaining a solid film without going through the gel state may be used.

In this way, the first layer 101a to the sixth layer 101f of the antireflection coating 101 are formed by electron beam deposition, which is a dry process, and the seventh layer 101g, which is the top layer, is formed by a wet process using the sol solution prepared by a hydrofluoric acid/magnesium acetate method according to the following procedure.

First using a vacuum deposition apparatus, an aluminum oxide layer to be the first layer 101a, a titanium oxide-zirconium oxide mixed layer to be the second layer 101b, an aluminum oxide layer to be the third layer 101c, a titanium oxide-zirconium oxide mixed layer to be the fourth layer 101d, an aluminum oxide layer to be the fifth layer 101e, and a titanium oxide-zirconium oxide mixed layer to be the sixth layer 101f are sequentially formed on a film deposition surface of the lens (above mentioned optical surface of the optical member 102). After removing the optical member 102 from the deposition apparatus, the silicon alkoxide-added sol solution, prepared by the hydrofluoric acid/magnesium acetate method is coated by a spin coat method, so as to form a layer made of a mixture of magnesium fluoride and silica to be the seventh layer 101g. The reaction formula when the sol solution is prepared by the hydrofluoric acid/magnesium acetate method is shown by the following expression (b).

$$2HF+Mg(CH_3COO)_2 \rightarrow MgF_2+2CH_3COOH \qquad (b)$$

For the sol solution used for this film deposition, raw materials are mixed, aged and heated at high temperature in an autoclave at 140° C. for 24 hours first, and is then used for film deposition. After depositing the film of the seventh layer 101g, the optical member 102 is heated at 160° C. for one hour in air, and the process is then completed. By using this sol-gel method, several nm to several tens nm of particles are deposited with voids, whereby the seventh layer 101g is formed.

The optical performance of an optical member having the antireflection coating 101 formed as described above will be described using the spectral characteristic shown in FIG. 12.

The optical member (lens) having the antireflection coating according to this embodiment is formed under the conditions shown in Table 4 hereinbelow. Table 4 shows each optical film thickness of the layers 101a (first layer) to 101g (seventh layer) of the antireflection coating 101 for the cases when the reference wavelength is λ and the refractive index of the substrate (optical member) is 1.62, 1.74 or 1.85. In Table 4, Al2O3 denotes aluminum oxide, ZrO2+TiO2 denotes a mixture of titanium oxide and zirconium oxide, and MgF2+SiO2 denotes a mixture of magnesium fluoride and silica.

TABLE 4

| | Substance | Refractive index | Optical film thickness | Optical film thickness | Optical film thickness |
|---|---|---|---|---|---|
| Medium | Air | 1 | | | |
| Seventh layer | MgF2 + SiO2 | 1.26 | 0.268λ | 0.271λ | 0.269λ |
| Sixth layer | ZrO2 + TiO2 | 2.12 | 0.057λ | 0.054λ | 0.059λ |
| Fifth layer | Al2O3 | 1.65 | 0.171λ | 0.178λ | 0.162λ |

TABLE 4-continued

|  | Substance | Refractive index | Optical film thickness | Optical film thickness | Optical film thickness |
|---|---|---|---|---|---|
| Fourth layer | ZrO2 + TiO2 | 2.12 | 0.127λ | 0.13λ | 0.158λ |
| Third layer | Al2O3 | 1.65 | 0.122λ | 0.107λ | 0.08λ |
| Second layer | ZrO2 + TiO2 | 2.12 | 0.059λ | 0.075λ | 0.105λ |
| First layer | Al2O3 | 1.65 | 0.257λ | 0.03λ | 0.03λ |
| Refractive index of substrate |  |  | 1.62 | 1.74 | 1.85 |

Figure 12:
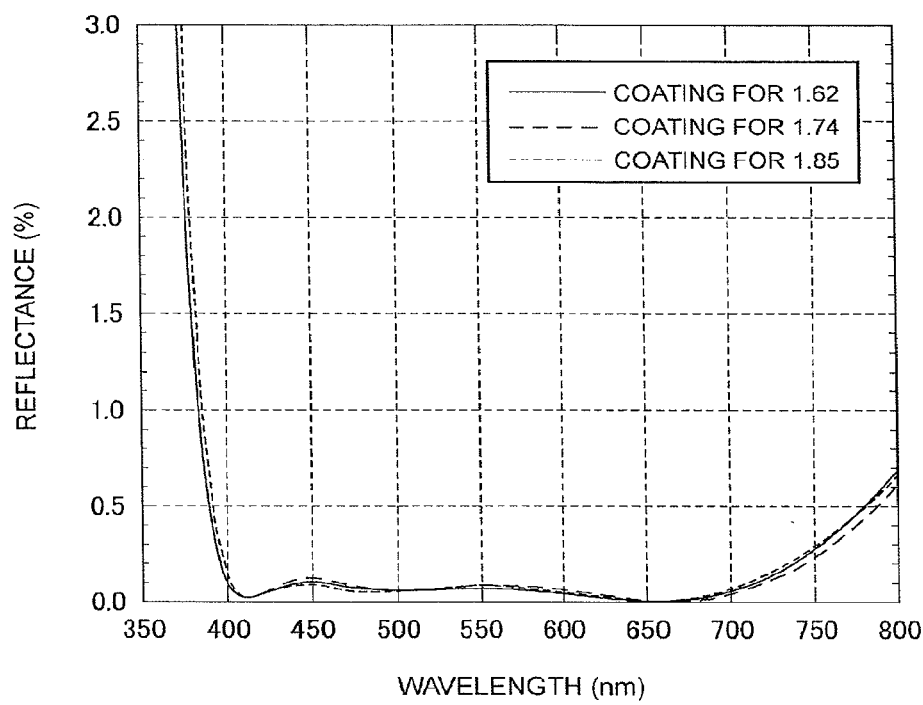
FIG. 12 is a graph depicting a spectral characteristic of the antireflection coating.

FIG. 12 shows a spectral characteristic when the beam vertically enters the optical member where the optical film thickness of each layer of the antireflection coating 101 is designed regarding the reference wavelength λ as 550 nm in Table 4.

As FIG. 12 shows, in the optical member having the antireflection coating 101 designed regarding the reference wavelength λ as 550 nm, the reflectance is controlled to 0.2% or less in the entire region of 420 nm to 720 nm of wavelength of the beam. Even in an optical member having the antireflection coating 101, where each optical film thickness is designed regarding the reference wavelength λ as the d-line (wavelength: 587.6 nm) in Table 4, the spectral characteristic remains hardly changed, and the same spectral characteristic, as the case of the 550 nm of reference wavelength λ shown in FIG. 12, is substantially obtained.

Now a modification of the antireflection coating according to this embodiment will be described. This antireflection coating is constituted by five layers, and as in Table 4, the optical film thickness of each layer, with respect to the reference wavelength λ, is designed under the conditions shown in Table 5. In this modification, the above mentioned sol-gel method is used to form the fifth layer.

TABLE 5

|  | Substance | Refractive index | Optical film thickness | Optical film thickness |
|---|---|---|---|---|
| Medium | Air | 1 |  |  |
| Fifth layer | MgF2 + SiO2 | 1.26 | 0.275λ | 0.269λ |
| Fourth layer | ZrO2 + TiO2 | 2.12 | 0.045λ | 0.043λ |
| Third layer | Al2O3 | 1.65 | 0.212λ | 0.217λ |
| Second layer | ZrO2 + TiO2 | 2.12 | 0.077λ | 0.066λ |
| First layer | Al2O3 | 1.65 | 0.288λ | 0.290λ |
| Refractive index of substrate |  |  | 1.46 | 1.52 |

Figure 13:
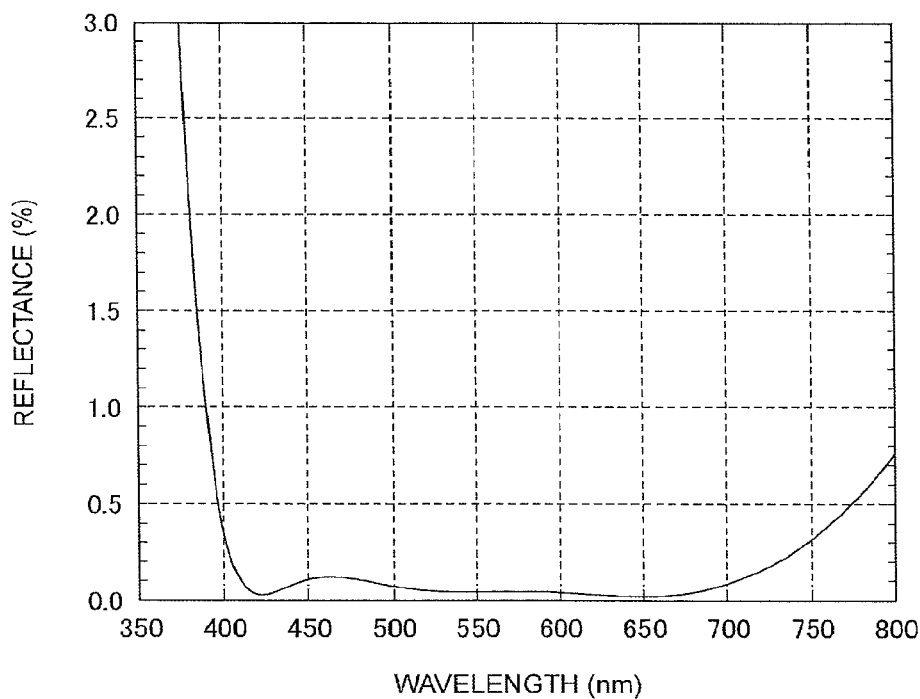
FIG. 13 is a graph depicting a spectral characteristic of an antireflection coating according to a modification.

FIG. 13 shows a spectral characteristic when the beam vertically enters the optical member where each optical film thickness is designed regarding the refractive index of the substrate as 1.52, and the reference wavelength λ as 550 nm in Table 5. As FIG. 13 shows, in the antireflection coating of the modification, the reflectance is controlled to 0.2% or less in the entire region of 420 nm to 720 nm of the wavelength of the beam. Even in the optical member having the antireflection coating where each optical film thickness is designed regarding the reference wavelength λ as the d-line (wavelength: 587.6 nm) in Table 5, the spectral characteristic remains hardly changed, and the same spectral characteristic as that in FIG. 13 is substantially obtained.

Figure 14:
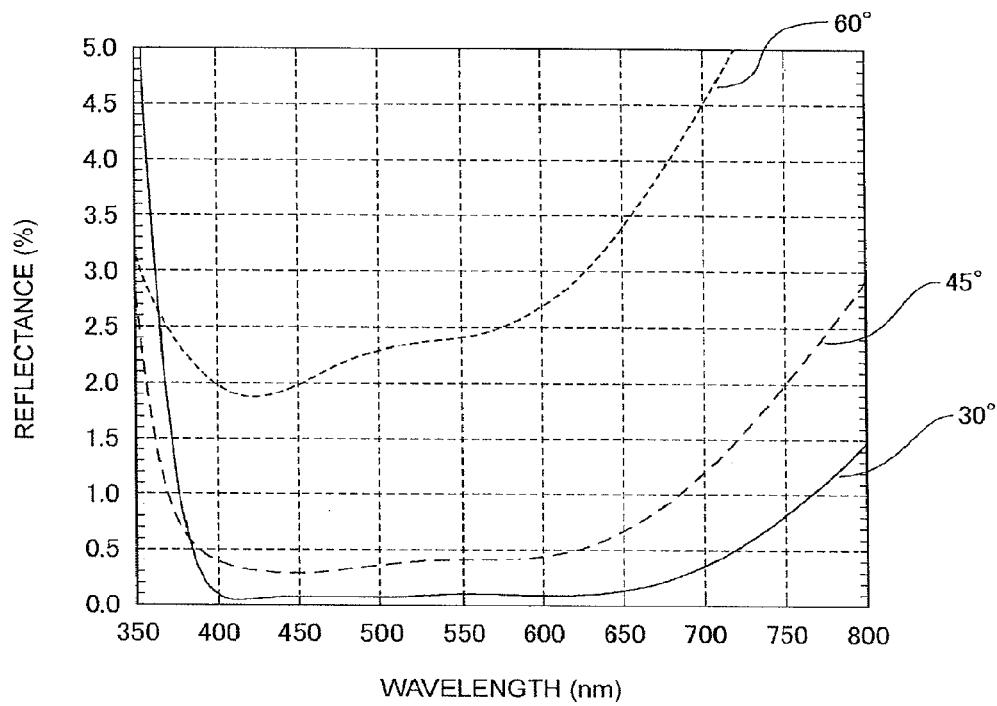
FIG. 14 is a graph depicting an incident angle dependency of the spectral characteristic of the antireflection coating according to the modification.

FIG. 14 shows spectral characteristics when the incident angles of the beam that enters the optical member having the spectral characteristic in FIG. 13 are 30°, 45° and 60° respectively. FIG. 13 and FIG. 14 do not show the spectral characteristic of the optical member having an antireflection coating of which refractive index of the substrate is 1.46 shown in Table 5, but needless to say, this optical member has substantially the same spectral characteristic as the case when the refractive index of the substrate is 1.52.

Figure 15:
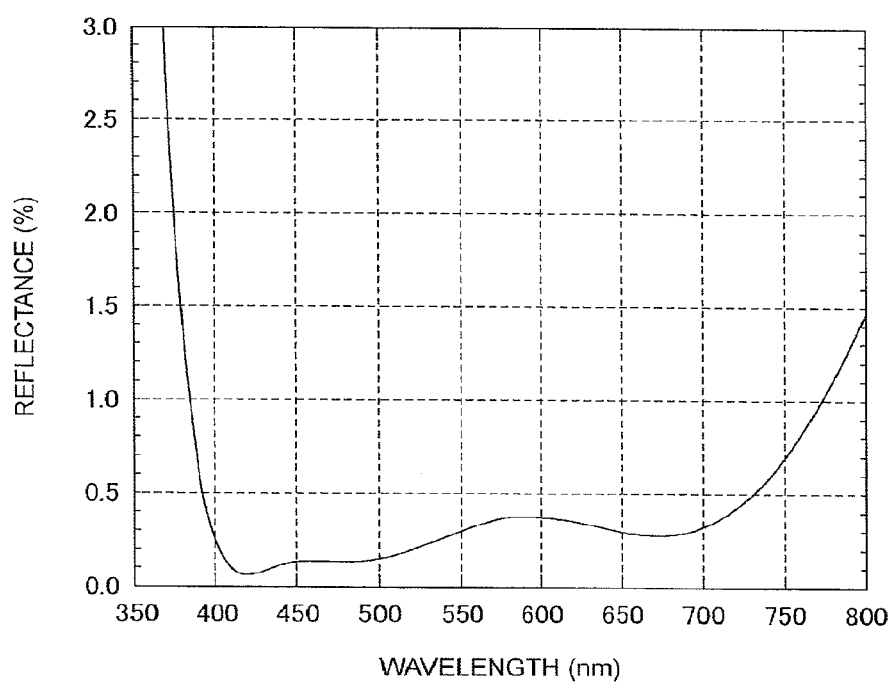
FIG. 15 is a graph depicting a spectral characteristic of an antireflection coating formed by a prior art.
Figure 16:
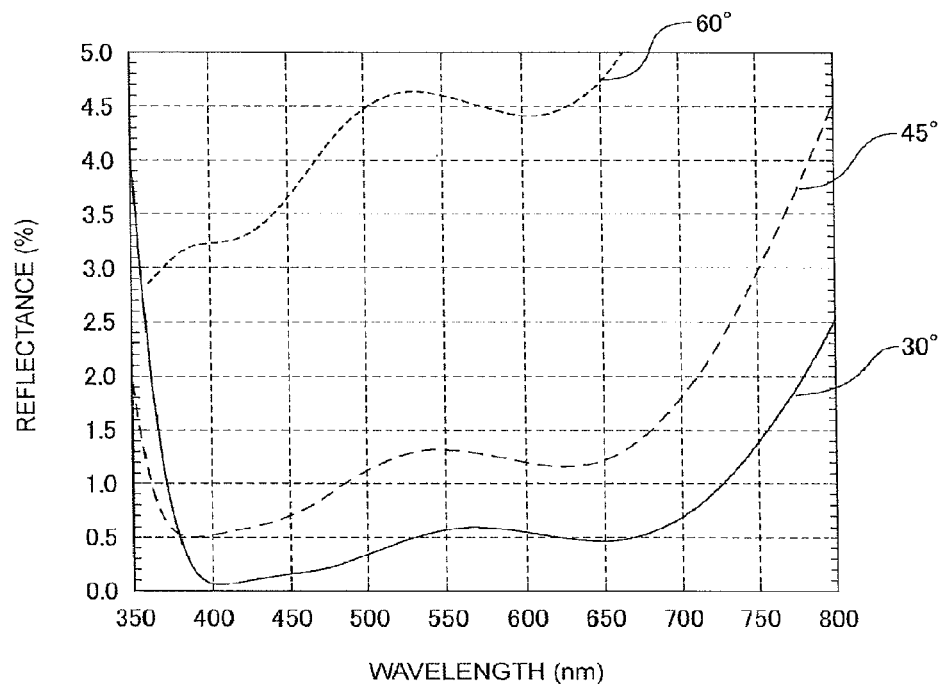
FIG. 16 is a graph depicting an incident angle dependency of the spectral characteristic of the antireflection coating formed by the prior art.

For comparison, FIG. 15 shows an example of an antireflection coating formed only by a dry process, such as a conventional vacuum deposition method. FIG. 15 shows a spectral characteristic when the beam vertically enters the optical member where the antireflection coating is designed under the conditions shown in Table 6 with a 1.52 refractive index of the substrate shown in Table 5. FIG. 16 shows spectral characteristics when the incident angles of the beam that enters the optical member having the spectral characteristic in FIG. 15 are 30°, 45° and 60° respectively.

TABLE 6

|  | Substance | Refractive index | Optical film thickness |
|---|---|---|---|
| Medium | Air | 1 |  |
| Seventh layer | MgF2 | 1.39 | 0.243λ |
| Sixth layer | ZrO2 + TiO2 | 2.12 | 0.119λ |
| Fifth layer | Al2O3 | 1.65 | 0.057λ |
| Fourth layer | ZrO2 + TiO2 | 2.12 | 0.220λ |
| Third layer | Al2O3 | 1.65 | 0.064λ |
| Second layer | ZrO2 + TiO2 | 2.12 | 0.057λ |
| First layer | Al2O3 | 1.65 | 0.193λ |
| Refractive index of substrate |  |  | 1.52 |

Comparing the spectral characteristic of the optical member having the antireflection coating according to this embodiment shown in FIG. 12 to FIG. 14 with the spectral characteristic of the prior art shown in FIG. 15 and FIG. 16, it is clear that the antireflection coating according to this embodiment has low reflectance at any incident angle, and also has low reflectance in a wider bandwidth.

Now examples when the antireflection coating shown in Table 4 is applied to the eyepiece lenses EL (EL1 to EL3) according to Example 1 to Example 3 will be described.

In the eyepiece lens EL1 of Example 1, the refractive index of the negative meniscus lens L1 of the first lens group G1 is nd=1.84666, and the refractive index of the biconvex positive lens L2 of the second lens group G2 is nd=1.77387 as shown in Table 1, therefore if the antireflection coating 101, of which refractive index of the substrate is 1.85 (see Table 4), is used for the image plane side lens surface of the negative meniscus lens L1, and the antireflection coating, of which refractive index of the substrate is 1.74 (see Table 4), is used for the object side lens surface of the biconvex positive lens L2, then reflected light from each lens surface can be decreased, and ghosts and flares can be reduced.

In the eyepiece lens EL2 of Example 2, the refractive index of the biconvex positive lens L2 of the second lens group G2 is nd=1.75550, and the refractive index of the negative meniscus lens L3 of the third lens group G3 is nd=1.90366, as shown in Table 2, therefore if the antireflection coating 101, of which refractive index of the substrate is 1.74 (see Table 4), is used for the image plane side lens surface of the biconvex positive lens L2, and the antireflection coating of which refractive index of the substrate is 1.85 (see Table 4) is used for the object side lens surface of the negative meniscus lens L3, then reflected light from each lens surface can be decreased, and ghosts and flares can be reduced.

In the eyepiece lens EL3 of Example 3, the refractive index of the biconvex positive lens L2 of the second lens group G2 is nd=1.77250, as shown in Table 3, therefore if the antireflection coating 101, of which refractive index of the substrate is 1.74 (see Table 4), is used for the object side lens surface of the biconvex positive lens L2, and the antireflection coating, of which refractive index of the substrate is 1.85 (see Table 4), is used for the image plane side lens surface of the biconvex positive lens L2, then reflected light from each lens surface can be decreased, and ghosts and flares can be reduced.

The present invention was described with the configuration requirements of the embodiment for better understanding, but needless to say the present invention is not limited thereto.

For example, the eyepiece lens EL according to this embodiment can be used not only as the eyepiece lens of the viewfinder optical system VF of the single-lens reflex camera shown in FIG. 9, but also as the eyepiece lens of the viewfinder optical system of a real image optical system in general.

In the eyepiece lens EL according to this embodiment, the diopter adjustment can be performed by moving the second lens group G2 along the optical axis, but is not limited to this configuration. All that is required is that the diopter adjustment can be performed by moving at least one of the first lens group G1, the second lens group G2 and the third lens group G3 along the optical axis, such as moving the first lens group G1, or moving both the first lens group G1 and the second lens group G2.

In the eyepiece lens EL according to this embodiment, an antireflection coating having high transmittance in a wide wavelength region may be formed on each lens surface in order to reduce ghosts and flares and implement high optical performance with high contrast. Needless to say, an antireflection coating that includes at least one layer formed by a wet process may be formed on each lens surface.

Embodiment 2

An eyepiece optical system according to Embodiment 2 will now be described. The eyepiece optical system according to Embodiment 2 is disposed to form an image, which is displayed on such a display member as liquid crystal, to the eye of the user. In an eyepiece lens according to this embodiment, an antireflection coating is formed on at least one surface among the optical surfaces constituting the eyepiece lens, and the antireflection coating includes at least one layer formed by a wet process. By this configuration, the eyepiece lens EL according to this embodiment can further reduce ghosts and flares which are generated by the light from the object side or from the eye point side that are reflected on the optical surface, and can implement high image forming performance.

The eyepiece optical system according to Embodiment 2 includes an eyepiece lens, and a meniscus-shaped optical member disposed as a protective window on the eye side of the eyepiece lens (hereafter called "protective window" in Embodiment 2), wherein the following expression (5) is satisfied, where fe denotes a focal length of the eyepiece lens when the diopter of the eyepiece lens is 0 [m$^{-1}$], and Rm denotes a radius of curvature of the meniscus-shaped surface.

$$2.00 < Rm/fe < 22.00 \qquad (5)$$

In the eyepiece optical system according to Embodiment 2, a meniscus-shaped protective window is included as the final optical member, on the eye side of the eyepiece lens, whereby the beam that enters from a bright point image (image of the display member) in the field of view to the surface of the protective window, and is reflected there diverges, therefore the re-imaging position of the bright point image can be moved away from the display member. Further, a re-imaged ghost image and the original real image cannot be viewed simultaneously, thereby the visibility of ghost images is decreased.

The conditional expression (5) specifies an optimum shape of the protective window. By satisfying the conditional expression (5), ghosts generated by a high brightness image can be effectively avoided.

If the lower limit value of the conditional expression (5) is not reached, ghosts generated within the field of view can be easily avoided, but the refractive power of the protective window increases, which affects the aberration performance of the total eyepiece optical system, making it impossible to implement a high image forming performance. To make the effect of the invention more reliable, it is more preferable to set the lower limit value of the conditional expression (5) to 4.85, then an even better optical performance with less aberrations can be implemented. If the lower limit value is set to 5.50, an even better optical performance can be implemented.

If the upper limit value of the conditional expression (5) is exceeded, the aberration performance of the eyepiece optical system is affected less, but the re-imaging position of the ghost light becomes closer to the display member, and ghost light is more easily generated. In this case, if the eyepiece optical system is moved along the optical axis for the diopter adjustment, ghost light may be easily viewed. To make the effect of the invention more reliable, it is more preferable to set the upper limit value of the conditional expression to 15.00, then the influence of ghosts can be further decreased. Furthermore, if the upper limit value is set to 10.00, the influence of ghosts can be further decreased.

In Embodiment 2, the conditional expression (5) specifies an optimum shape of the protective window as the final optical member, but only if an optical member is disposed on the eye side of the eyepiece optical system (even if it is not the final optical member), ghost light can be effectively reduced, and a high image forming performance can be implemented by satisfying the conditional expression (5).

Concerning the [m$^{-1}$] unit for the diopter, the diopter X [m$^{-1}$], for example, indicates a state where an image is generated by the eyepiece lens at a position that is 1/X [m(meter)] from the eye point on the optical axis (the sign is positive when the image is generated on the user side from the eyepiece lens).

Considering the diopter adjustment, it is preferable to set the radius of curvature such that a re-imaging position of the ghost light is at least 3×(fe$^2$/1000) away from the display member position in the optical axis direction. This conditional expression indicates three times the moving distance of the display member that is required to change the diopter by 1 [m$^{-1}$] at the display member position. In other words, when the diopter is set to the display member in the viewing state, the ghost image forming position is set to a state where the diopter differs by about 3 [m$^{-1}$]. By setting this status, the ghost image becomes less outstanding when viewing an image. It is certainly better to separate the re-imaging position more so than in the above conditions.

In the eyepiece optical system according to Embodiment 2, it is preferable that the meniscus-shaped optical member is disposed such that the concave surface faces the eye. If the concave surface faces the eye, the natural light from the eye side is reflected on the eye side surface of the protective window, and is less likely to enter the pupil of the user. Natural light when viewing an image in particular enters at a large angle with respect to the eyepiece optical axis, due to the positional relationship with the head of the user, hence if the eye side optical surface is concave, the optical surfaces becomes more to the rear compared with a convex surface, and natural light is less likely to enter. Even if the natural light does enter, the natural light is more likely to be reflected to outside the field of view, and does not enter the eye of the user very much, since the incident angle is larger compared with the case of a convex surface.

In the eyepiece optical system according to Embodiment 2, the following conditional expressions (6) and (7) are satisfied, where Y denotes a maximum image height of the real image to be viewed.

$$fe<40.00 \quad (6)$$

$$Y<fe/3.00 \quad (7)$$

The conditional expression (6) specifies the focal length of the eyepiece lens, and the conditional expression (7) specifies the upper limit of the maximum image height of the real image.

By satisfying the conditional expressions (6) and (7), ghosts can be avoided more effectively. If the upper limit of the conditional expression (7) is exceeded, the real image plane to be viewed becomes large, hence the curvature of the protective window influences the eyepiece aberration performance, particularly on the peripheral performance of the field of view. To make the effect of the present invention more reliable, it is more preferable to set the upper limit value of the conditional expression (7) to fe/3.5, then ghosts can be avoided more effectively. If the upper limit value is set to fe/4.0, ghosts can be avoided even more effectively.

In Embodiment 2, it is preferable that the protective window is made of resin. Then the protective window becomes light and is easily molded, and can have better shock resistance. Acryl or polycarbonate, for example, can be used for the resin.

Each example of the eyepiece optical system according to Embodiment 2 will now be described with reference to the accompanying drawings.

Example 4

Figure 17:
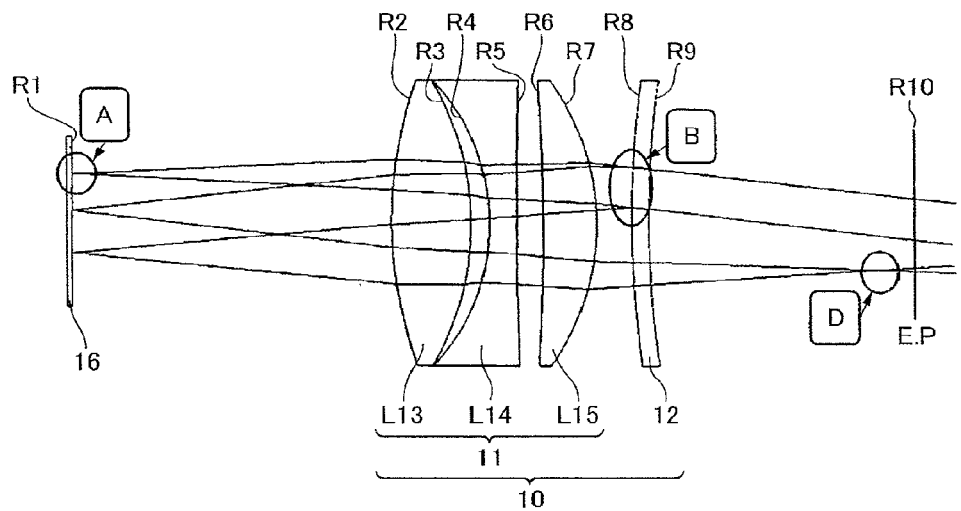
FIG. 17 is a cross-sectional view depicting a configuration of an eyepiece optical system according to Example 4.

FIG. 17 is a cross-sectional view depicting a configuration of an eyepiece optical system according to Example 4 of Embodiment 2. The eyepiece optical system according to Example 4 of Embodiment 2 includes, in order from an object, an eyepiece lens 11 and a protective window 12.

The eyepiece lens 11 includes a biconvex positive lens L13, a biconcave negative lens L14 and a positive meniscus lens L15 having a concave surface facing the object.

In Example 4, the protective window 12 has a meniscus shape having a concave surface facing the eye. If the concave surface faces the eye, the natural light from the eye side is reflected onto the final optical member surface and is less likely to enter the pupil of the user. Natural light when viewing an image in particular enters at a large angle with respect to the eyepiece optical axis, due to the positional relationship with the head of the user. Hence if the optical surface is concave, the optical surface becomes more to the rear compared with a convex surface, and the natural light is less likely to enter. Even if the natural light does enter, the natural light is more likely to be reflected to outside the field of view, since the incident angle is larger compared with the case of a convex surface.

In Example 4, the radius of curvature of the protective window 12 is 50 mm for both surfaces on the object side and the eye side. Even if both surfaces have a same radius of curvature like this, the protective window 12 has refractive power, although very low. However this hardly affects the aberration performance of the eyepiece lens in the case of Example 4, because the incident angle of the converged light to the curved surface, in the direction from the eyepiece lens to the eye point E.P, can be decreased by increasing the radius of curvature and turning the convex surface of the curved surface to face the eyepiece lens.

FIG. 17 shows the optical paths of the display light from the display member 16 and the ghost light. The ghost light is such that, even if the light of the image at point A of the display member 16 is reflected on the surface (point B) of the protective window 12, the surface of the protective window 12 facing the display member 16 functions to diverge the reflected light by providing the protective window 12 with a curvature, hence the reflected light does not form an image near the display member, but is reflected on the surface of the display member 16, enters the eyepiece lens 11 and the protective window 12, and is collected at point D near the eye point. Therefore this reflected light reaches the eye as a stray light, but cannot be viewed by the user as a ghost image.

Table 7 shows the data values of the eyepiece optical system according to Example 4 of Embodiment 2. The focal length of the eyepiece lens is fe=24.59 mm. The maximum height of the object to-be-viewed is assumed to be 6.0 nm in Example 4 and in subsequent examples. The surface numbers 1 to 10 in Table 7 correspond to the respective optical surfaces having the radius of curvatures R1 to R10 shown in FIG. 17.

TABLE 7

[Lens Data]

| Surface number | R | d | n(d) | vd |
|---|---|---|---|---|
| 1 | ∞ | 18.5 | | |
| *2 | 18.46305 | 4.5 | 1.49108 | 57.57 |
| 3 | −14.09265 | 1.0 | | |
| *4 | −10.86467 | 1.5 | 1.58518 | 30.24 |
| 5 | 203.88888 | 1.5 | | |
| 6 | −95.39091 | 3.0 | 1.49108 | 57.57 |
| *7 | −11.57101 | 1.5 | | |
| 8 | 50.00000 | 1.0 | 1.49108 | 57.57 |
| 9 | 50.00000 | 15.0 | | |
| 10 | E.P | | | |

TABLE 7-continued

[Aspherical Data]

Surface 2 κ = −1.7818, A6 = 0.0
Surface 4 κ = 1.0000, A6 = 0.65762E−06
Surface 7 κ = 0.5034, A6 = 0.0

[Conditional Expressions]

Conditional expression (5) Rm/fe = 2.03
Conditional expression (6) fe = 24.59
Conditional expression (7) fe/3 = 8.19

Figure 18:
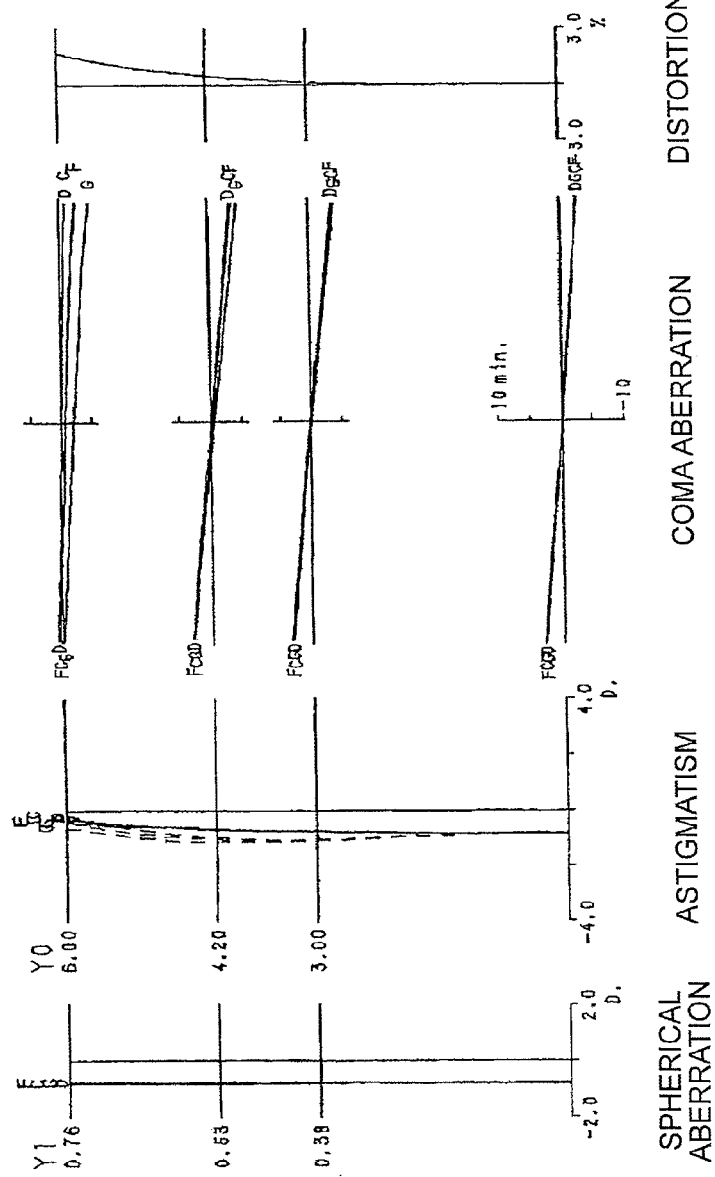
FIG. 18 is a set of graphs showing various aberrations of the eyepiece optical system according to Example 4.

FIG. 18 are graphs showing various aberrations of the eyepiece optical system according to Example 4 of the present invention. In the graphs showing spherical aberration, "Y1" denotes an incident height of the beam when entering the erected system, and "Y0" denotes a height of the display member in the graphs showing astigmatism. "min" in the graphs showing coma aberration indicates a minute of the angle unit. In the graphs, "C", "F", "D" and "G" denote aberration curves with respect to the C-line (wavelength: 656.3 nm), the F-line (wavelength: 486.1 nm), the d-line (wavelength: 587.6 nm), and the g-line (wavelength: 435.8 nm) respectively. In the graphs showing spherical aberration and the graphs showing astigmatism, the unit of the abscissa "D" is [m$^{-1}$]. The reference symbols used for Example 4 are also used for the graphs showing aberrations in Example 5 to Example 8, which are described later.

As each graph showing aberrations in FIG. 18 clarifies, the eyepiece optical system 10 according to Example 4 can correct various aberrations satisfactorily and has superb image forming performance. Further, as shown in the comparison with graphs showing aberrations of a later mentioned reference example in FIG. 28, the aberration performance of the eyepiece optical system 10 does not deteriorate, even if the protective window 12 having a radius of curvature within the range of the conditional expression (5) is disposed.

Example 5

Figure 19:
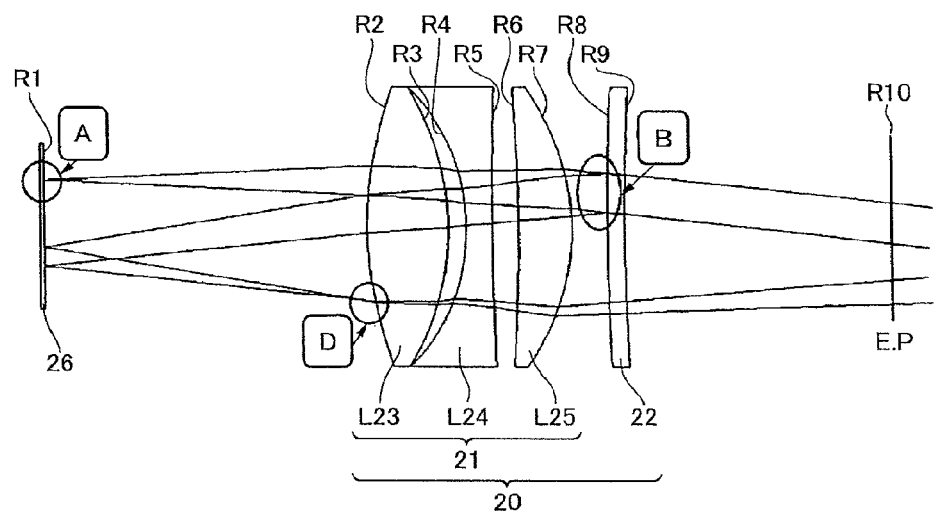
FIG. 19 is a cross-sectional view depicting a configuration of an eyepiece optical system according to Example 5.

FIG. 19 is a cross-sectional view depicting a configuration of an eyepiece optical system 20 according to Example 5 of Embodiment 2. Example 5 has a lens configuration that is basically the same as Example 4, but a difference is that the radius of curvature of the protective window 22 is 125 mm in Example 5, which is 50 nm in Example 4.

FIG. 19 shows the optical paths of the display light from a display member 26 and the ghost light. Since the radius of curvature of the protective window 22 is larger than Example 4, the function to diverge the ghost light is weakened, and the re-imaging position (point D) of the ghost light is closer to the display member than the case of Example 4 in FIG. 17. However the user does not view the re-imaged ghost light as a ghost image at the eye point, since the re-imaging position (point D) is sufficiently far from the point that is 3×(fe$^2$/1000) distant from the display member. This means that ghosts can be effectively reduced if the lower limit value of the conditional expression (5) of the present invention is satisfied.

Table 8 shows the data values of the eyepiece optical system according to Example 5. The focal length of the eyepiece lens is fe=24.59 mm. The surface numbers 1 to 10 in Table 8 correspond to the respective optical surfaces having the radius of curvatures R1 to R10 shown in FIG. 19.

TABLE 8

[Lens Data]

| Surface number | R | d | n(d) | vd |
|---|---|---|---|---|
| 1 | ∞ | 18.5 | | |
| *2 | 18.46305 | 4.5 | 1.49108 | 57.57 |
| 3 | −14.09265 | 1.0 | | |
| *4 | −10.86467 | 1.5 | 1.58518 | 30.24 |
| 5 | 203.88888 | 1.5 | | |
| 6 | −95.39091 | 3.0 | 1.49108 | 57.57 |
| *7 | −11.57101 | 1.5 | | |
| 8 | 125.00000 | 1.0 | 1.49108 | 57.57 |
| 9 | 125.00000 | 15.0 | | |
| 10 | E.P | | | |

[Aspherical Data]

Surface 2 κ = −1.7818, A6 = 0.0
Surface 4 κ = 1.0000, A6 = 0.65762E−06
Surface 7 κ = 0.5034, A6 = 0.0

[Conditional Expressions]

Conditional expression (5) Rm/fe = 5.08
Conditional expression (6) fe = 24.59
Conditional expression (7) fe/3 = 8.19

Figure 20:
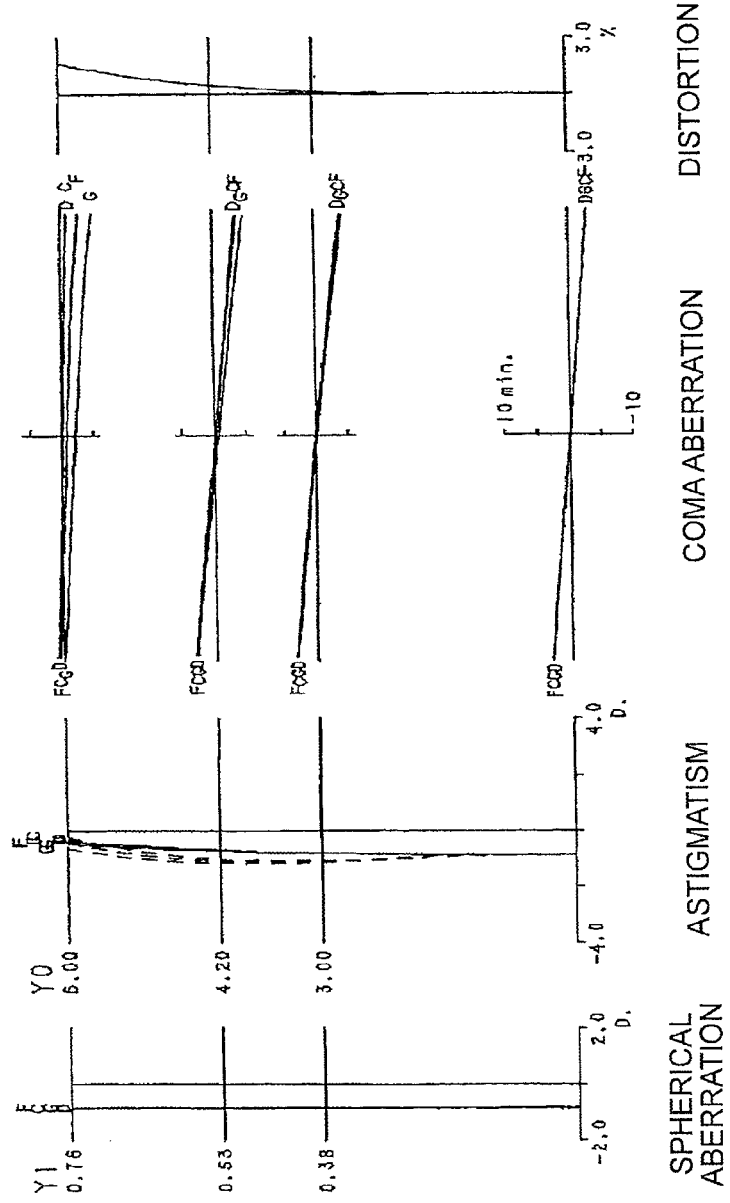
FIG. 20 is a set of graphs showing various aberrations of the eyepiece optical system according to Example 5.

FIG. 20 is a set of graphs showing various aberrations of the eyepiece optical system 20 according to Example 5 of the present invention. As each graph showing aberrations clarifies, the eyepiece optical system 20 according to Example 5 can correct various aberrations satisfactorily and has superb image forming performance. Further, as shown in the comparison with graphs showing aberrations of a later mentioned reference example in FIG. 28, the aberration performance of the eyepiece optical system 20 does not deteriorate, even if the protective window 22 having a radius of curvature within the range of the conditional expression is disposed.

Example 6

Figure 21:
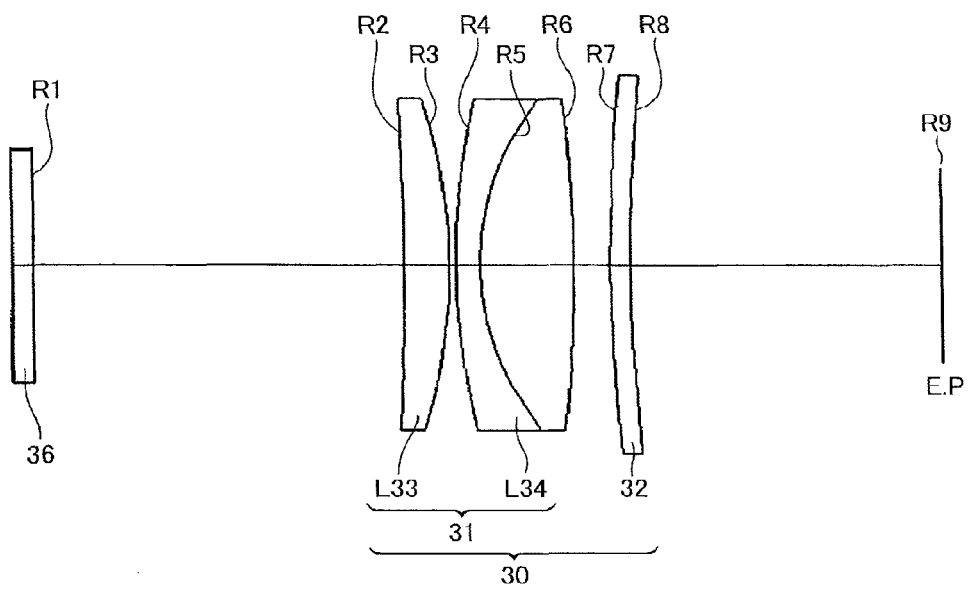
FIG. 21 is a cross-sectional view depicting a configuration of an eyepiece optical system according to Example 6.

FIG. 21 is a cross-sectional view depicting a configuration of an eyepiece optical system 30 according to Example 6 of Embodiment 2. The eyepiece optical system 30 according to Example 6 includes, in order from an object, an eyepiece lens 31 and a protective window 32.

The eyepiece lens 31 includes a positive meniscus lens L33 having a concave surface facing the object, and a cemented lens L34 of a negative meniscus lens having a convex surface facing the object and a biconvex positive lens.

In Example 6, the protective window 32 has a meniscus shape having a concave surface facing the eye, where the radius of curvature of the surface on the object side is 90 mm, and the radius of curvature of the surface on the eye side is 95 mm, that is, the radius of curvature is different between the surface on the object side and the surface on the eye side.

In the present invention, providing refractive power, that is about 1/100 of the focal length of the eye piece lens, to the optical member disposed on the eye side does not affect the aberrations of the eye piece lens, hence there is no problem even if the radius of curvature is changed before and after the final optical member within this range. The curvature may be set such that the surface on the object side and the surface on the eye side form concentric circles. In this case as well, the effect of avoiding ghosts can be implemented without affecting the aberration performance.

Table 9 shows the data values of the eyepiece optical system according to Example 6. The focal length of the eyepiece lens is fe=23.16 mm. The surface numbers 1 to 9 in Table 9 correspond to the respective optical surfaces having the radius of curvatures R1 to R9 shown in FIG. 21.

TABLE 9

[Lens Data]

| Surface number | R | d | n(d) | vd |
|---|---|---|---|---|
| 1 | ∞ | 20.2 | | |
| 2 | −175.00000 | 2.2 | 1.51680 | 64.14 |
| 3 | −29.50000 | 0.3 | | |
| 4 | 38.00000 | 1.2 | 1.84666 | 23.78 |
| 5 | 14.00000 | 4.5 | 1.80400 | 46.58 |
| 6 | −78.00000 | 1.8 | | |
| 7 | 90.00000 | 1.0 | 1.49108 | 57.57 |
| 8 | 95.00000 | 15.2 | | |
| 9 | E.P | | | |

[Conditional Expressions]

Conditional expression (5) Rm(object side surface)/fe = 3.88
Conditional Expression (5) Rm(eye side surface)/fe = 4.09
Conditional expression (6) fe = 23.16
Conditional expression (7) fe/3 = 7.72

Figure 22:
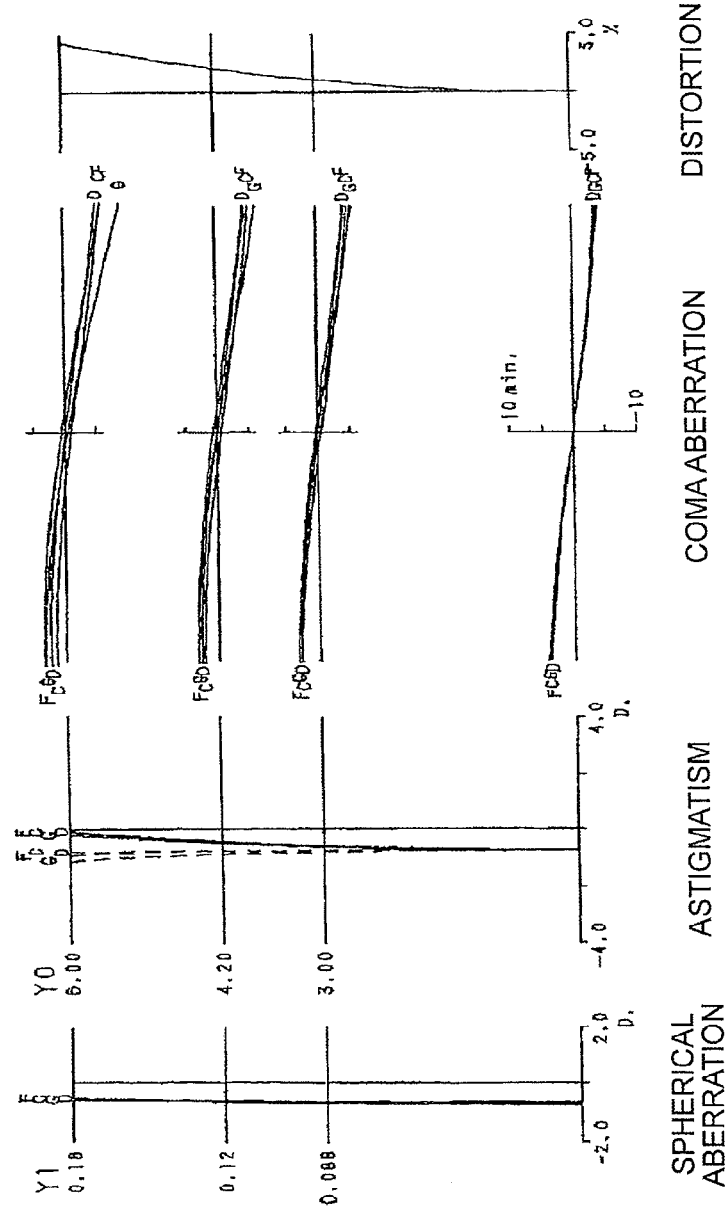
FIG. 22 is a set of graphs showing various aberrations of the eyepiece optical system according to Example 6.

FIG. 22 is a set of graphs showing various aberrations of the eyepiece optical system 30 according to Example 6 of Embodiment 2. As each graph showing aberrations clarifies, the eyepiece optical system 30 according to Example 6 can correct various aberrations satisfactorily and has superb image forming performance. Further, as shown in the comparison with FIG. 18 according to Example 4 and FIG. 20 according to Example 5, the aberration performance of the eyepiece optical system 30 does not deteriorate, even if the radius of curvature is different between the surface on the object side and the surface on the eye side of the protective window 32 within the range of conditional expression (5).

Example 7

Figure 23:
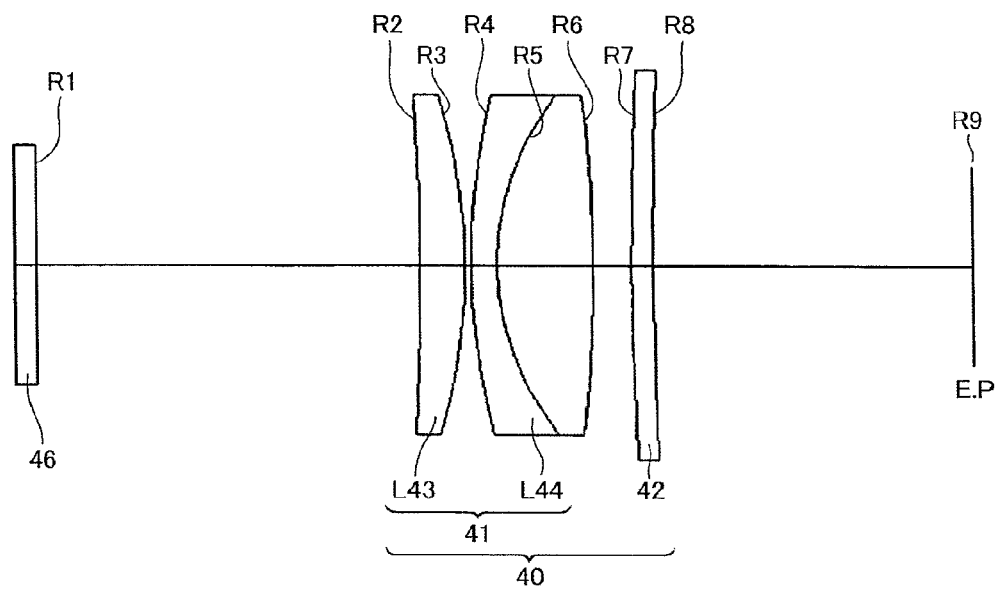
FIG. 23 is a cross-sectional view depicting a configuration of an eyepiece optical system according to Example 7.

FIG. 23 is a cross-sectional view depicting a configuration of an eyepiece optical system according to Example 7 of Embodiment 2. Example 7 has a lens configuration that is basically the same as Example 6, but a difference is that the radius of curvature of the protective window 42 is 200 mm on the object side surface, and 240 mm on the eye side surface in Example 7, which is 90 mm on the object side surface, and 95 mm on the eye side surface in Example 6.

Table 10 shows the data values of the eyepiece optical system according to Example 7. The focal length of the eyepiece lens is fe=23.16 mm. The surface numbers 1 to 9 in Table 10 correspond to the respective optical surfaces having the radius of curvatures R1 to R9 shown in FIG. 23.

TABLE 10

[Lens Data]

| Surface number | R | d | n(d) | vd |
|---|---|---|---|---|
| 1 | ∞ | 20.2 | | |
| 2 | −175.00000 | 2.2 | 1.51680 | 64.14 |
| 3 | −29.50000 | 0.3 | | |
| 4 | 38.00000 | 1.2 | 1.84666 | 23.78 |
| 5 | 14.00000 | 4.5 | 1.80400 | 46.58 |
| 6 | −78.00000 | 1.8 | | |
| 7 | 200.00000 | 1.0 | 1.49108 | 57.57 |
| 8 | 240.00000 | 15.2 | | |
| 9 | E.P | | | |

[Conditional Expressions]

Conditional expression (5) Rm(object side surface)/fe = 8.62
Conditional expression (5) Rm(eye side surface)/fe = 10.35
Conditional expression (6) fe = 23.16
Conditional expression (7) fe/3 = 7.72

Figure 24:
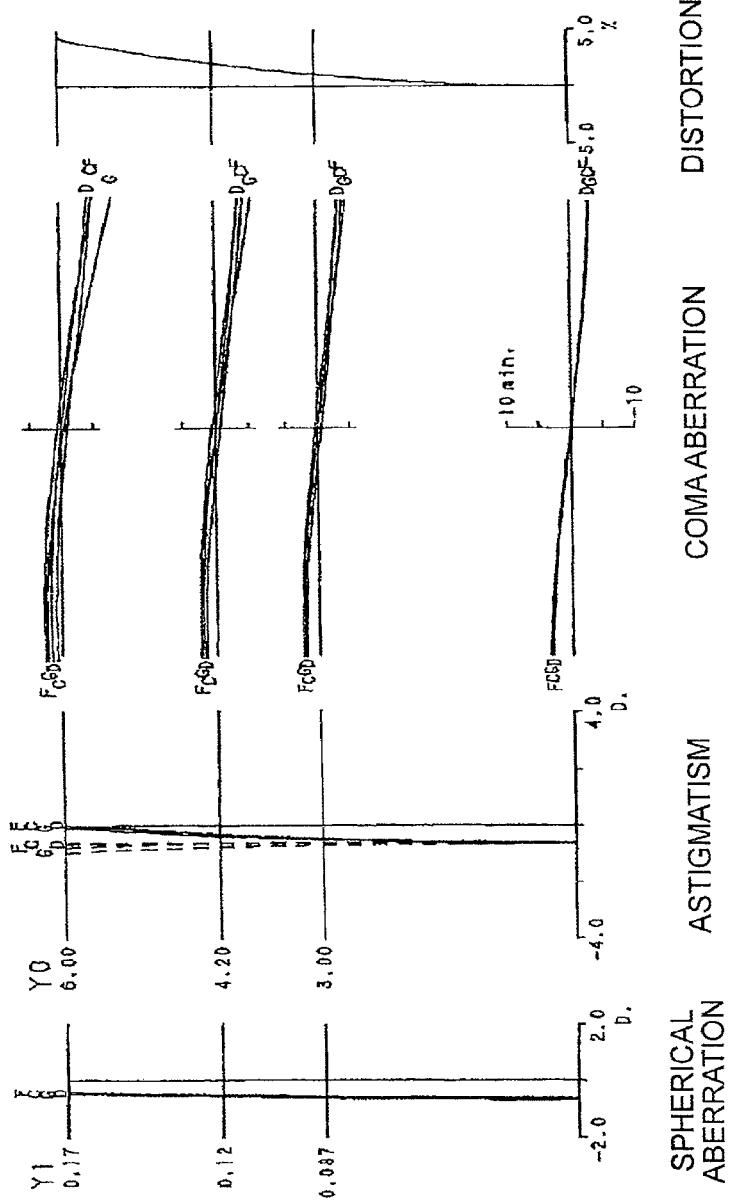
FIG. 24 is a set of graphs showing various aberrations of the eyepiece optical system according to Example 7.

FIG. 24 is a set of graphs showing various aberrations of the eyepiece optical system 40 according to Example 7 of Embodiment 2. As each graph showing aberrations clarifies, the eyepiece optical system 40 according to Example 7 can correct various aberrations satisfactorily and has superb image forming performance. Further, as shown in the comparison with FIG. 22 according to Example 6, even if the difference of the curvatures between the object side surface and the eye side surface of the protective window 42 is increased within the range of conditional expression (5), the aberration performance of the eyepiece optical system 40 does not deteriorate.

Example 8

Figure 25:
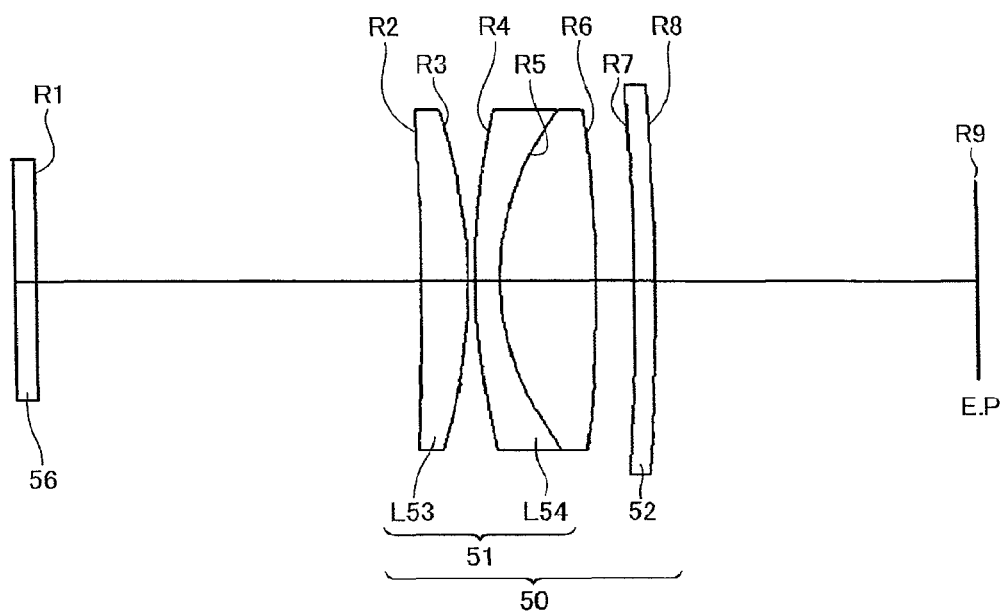
FIG. 25 is a cross-sectional view depicting a configuration of an eyepiece optical system according to Example 8.

FIG. 25 is a cross-sectional view depicting a configuration of an eyepiece optical system according to Example 8 of Embodiment 2. Example 8 has a lens configuration that is basically the same as Example 6 and Example 7, but differences are: the protective window 52 has a concave surface facing the object; and the radius of curvature is 150 mm for both the object side surface and the eye side surface.

Table 11 shows the data values of the eyepiece optical system according to Example 8. The focal length of the eyepiece lens is fe=23.16 mm. The surface numbers 1 to 9 in Table 11 correspond to the respective optical surfaces having the radius of curvatures R1 to R9 shown in FIG. 25.

TABLE 11

[Lens Data]

| Surface number | R | d | n(d) | vd |
|---|---|---|---|---|
| 1 | ∞ | 20.2 | | |
| 2 | −175.00000 | 2.2 | 1.51680 | 64.14 |
| 3 | −29.50000 | 0.3 | | |
| 4 | 38.00000 | 1.2 | 1.84666 | 23.78 |
| 5 | 14.00000 | 4.5 | 1.80400 | 46.58 |
| 6 | −78.00000 | 1.8 | | |
| 7 | −150.00000 | 1.0 | 1.49108 | 57.57 |
| 8 | −150.00000 | 15.2 | | |
| 9 | E.P | | | |

[Conditional Expressions]

Conditional expression (5) Rm/fe = 6.47
Conditional expression (6) fe = 23.16
Conditional expression (7) fe/3 = 7.72

Figure 26:
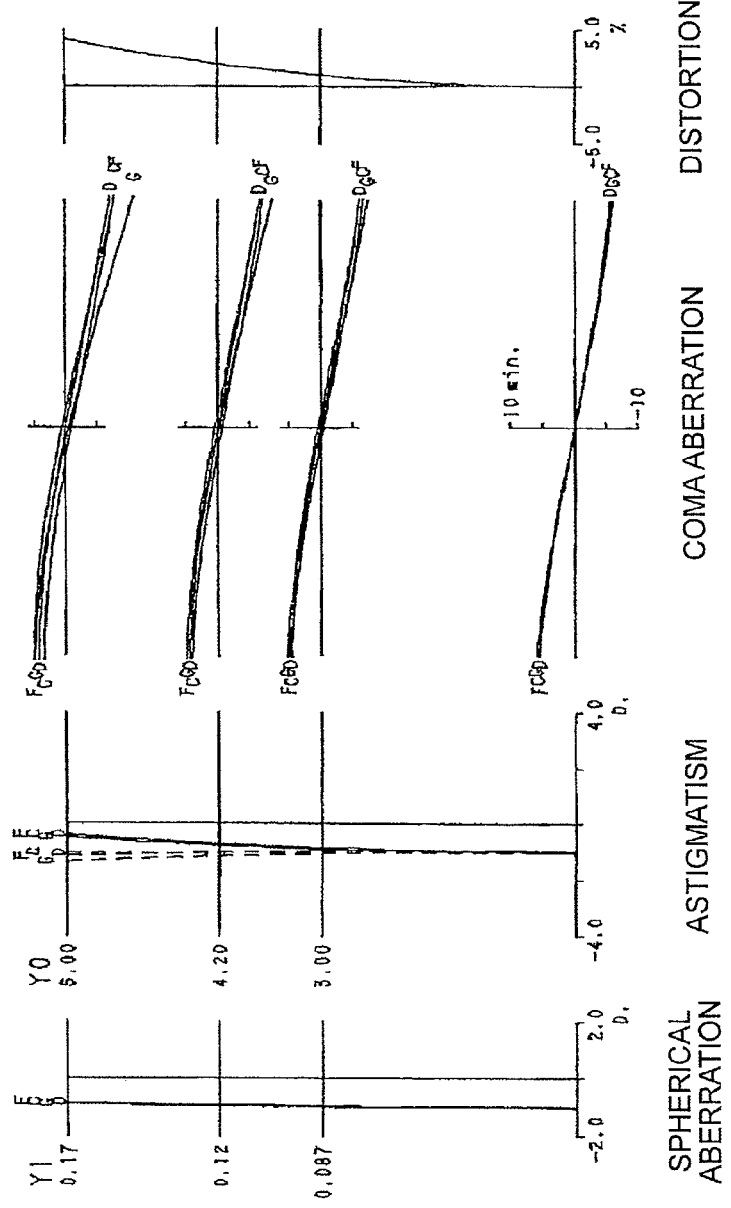
FIG. 26 is a set of graphs showing various aberrations of the eyepiece optical system according to Example 8.

FIG. 26 is a set of graphs showing various aberrations of the eyepiece optical system 50 according to Example 8 of the present invention. As each graph showing aberrations clarifies, the eyepiece optical system 50 according to Example 8 can correct various aberrations satisfactorily and has superb image forming performance. Further, as shown in the comparison with FIG. 22 according to Example 6 and FIG. 24 according to Example 7, even if the concave surface of the protective window 52 faces the object within the range of the conditional expression, the aberration performance of the eyepiece optical system 50 does not deteriorate.

Embodiment 3

An eyepiece optical system according to Embodiment 3 will now be described. The eyepiece optical system according to Embodiment 3 is disposed to form an image, which is displayed on such a display member as liquid crystals, to the eye of the user. In the eyepiece lens according to this embodiment, an antireflection coating is formed on at least one surface among the optical surfaces constituting the eyepiece lens, and the antireflection coating includes at least one layer formed by a wet process. By this configuration, the eyepiece lens according to this embodiment can further reduce ghosts and flares, which are generated by the light from the object side or from the eye point side that are reflected on the optical surface, and can implement high image forming performance.

The eyepiece optical system according to Embodiment 3 includes an eyepiece lens and an optical member disposed as a protective window on the eye side of the eyepiece lens (hereafter called "protective window"), wherein the optical member has a meniscus shape on the peripheral area thereof, and the following expression (5) is satisfied, where fe denotes a focal length of the eyepiece lens when the diopter of the eyepiece lens is 0 [m$^{-1}$], and Rm denotes a radius of curvature of the meniscus-shaped surface.

$$2.00 < Rm/fe < 22.00 \quad (5)$$

In the eyepiece optical system according to Embodiment 3, the peripheral area (in terms of the distance from the optical axis) of the eyepiece lens has a meniscus-shaped protective window on the eye side of the eyepiece lens, whereby the beam that enters from a bright point image (image of the display member) in the field of view to the peripheral area of the protective window and that is reflected there diverges, therefore the re-imaging position of the bright point image can be moved away from the display member. Further, a re-imaged ghost image and the original real image cannot be viewed simultaneously, thereby the visibility of ghost images is decreased.

The conditional expression (5) specifies an optimum shape of the peripheral area of the protective window. By satisfying the conditional expression (5), ghosts can be effectively avoided.

If the lower limit value of the conditional expression (5) is not reached, ghosts generated within the field of view can be easily avoided, but the refractive power of the peripheral area of the protective window increases, which affects the aberration performance of the total eyepiece optical system, making it impossible to implement high image forming performance. If the upper limit value of the conditional expression (5) is exceeded, the aberration performance of the eyepiece optical system is affected less, but the re-imaging position of the ghost light becomes closer to the display member, and ghost light is more easily generated. In this case, if the eyepiece optical system is moved along the optical axis for the diopter adjustment, ghost light may be easily viewed.

Embodiment 3 is different from Embodiment 2 in terms of specifying the peripheral area of the protective window, and ghosts can be effectively avoided by this configuration since ghost light tends to reflect easily in the peripheral area of the optical member disposed on the eye side.

The peripheral area in Embodiment 3 refers to a portion where the distance from the optical axis is outside the ¼ of the effective diameter of the eyepiece lens. This is because this portion in particular tends to influence the generation of ghosts.

The center portion where the distance from the optical axis is inside the ¼ of the effective diameter of the eyepiece lens, on the other hand, is plate like, in a direction perpendicular to the optical axis. This portion hardly reflects the ghost light, therefore this shape can suppress aberrations more so compared with the case of the entire surface being a curved surface.

In the eyepiece optical system according to Embodiment 3, it is preferable that the meniscus-shaped optical member is disposed such that the concave surface faces the eye. If the concave surface faces the eye, the natural light from the eye side is reflected on the eye side surface of the protective window, and is less likely to enter the pupil of the user. Natural light when viewing an image in particular enters at a large angle with respect to the eyepiece optical axis, due to the positional relationship with the head of the user, hence if the eye side optical surface is concave, the optical surface becomes more to the rear compared with a convex surface, and natural light is less likely to enter. Even if the natural light does enter, the natural light is more likely reflected to outside the field of view, and does not enter the eye of the user very much, since the incident angle is larger compared with the case of a convex surface.

In the eyepiece optical system according to Embodiment 3, the following conditional expressions (6) and (7) are satisfied, where Y denotes a maximum image height of the real image to be viewed.

$$fe < 40.00 \quad (6)$$

$$Y < fe/3.00 \quad (7)$$

The conditional expression (6) specifies the focal length of the eyepiece lens, and the conditional expression (7) specifies the upper limit of the maximum image height of the real image.

By satisfying the conditional expressions (6) and (7), ghosts can be avoided more effectively. If the upper limit of the conditional expression (7) is exceeded, the real image plane to be viewed becomes large, hence the curvature of the protective window influences the eyepiece aberration performance, particularly on the peripheral performance of the field of view.

In Embodiment 3, it is preferable that the protective window is made of resin. Then the protective window becomes light and is easily molded, and can have better shock resistance. Acryl or polycarbonate, for example, can be used for the resin.

Figure 27:
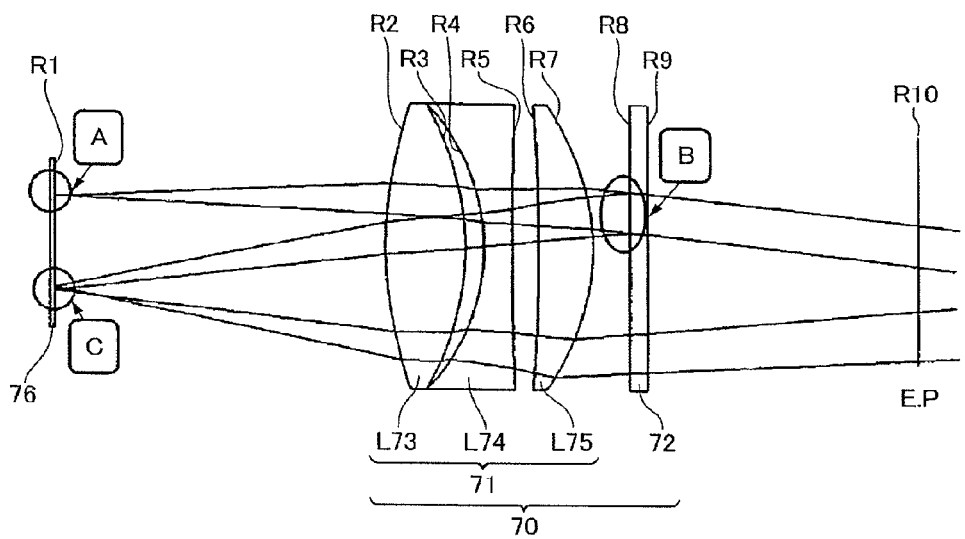
FIG. 27 is a cross-sectional view depicting a configuration of an eyepiece optical system according to a reference example.

FIG. 27 is a cross-sectional view depicting a configuration of an eyepiece optical system 70 as a reference example for comparing with examples of the invention, where a display member 76, such as an electronic viewfinder (EVF), is viewed using eyepiece lens 71 constituted by three lenses, and a protective window 72, which is a plane parallel plate, is disposed on the eye side of the eyepiece lens 71.

Just like Example 7 or Example 6, the eyepiece lens 71 includes a biconvex positive lens L73, a biconcave negative lens L74, and a positive meniscus lens L75 having a concave surface facing the object.

As shown in FIG. 27, the image of point A on the display member 76 is guided to the eye point (E.P) via the eyepiece lens, and is viewed. However if the brightness of the image of point A is high, the intensity of reflected light, which is reflected on the surface (point B) of the protective window 72, increases when the light transmits through the protective window 72. This reflected light transmits through the eyepiece lens 71, and the image of point A is formed again on the surface (point C) of the display member 76. Then the light is reflected again on the surface of the display member 76, and is guided to the eye point (E.P). If the brightness of the display around the point C is low at this time, the display image of point A, that is formed again, is viewed as a ghost.

Table 12 shows the data values of the eyepiece optical system according to this reference example. The focal length of the eyepiece lens is fe=24.59 mm. The surface numbers 1 to 10 in Table 12 correspond to the respective optical surfaces having the radius of curvatures R1 to R10 in FIG. 27.

TABLE 12

| Surface number | R | d | n(d) | vd |
|---|---|---|---|---|
| 1 | ∞ | 18.5 | | |
| *2 | 18.46305 | 4.5 | 1.49108 | 57.57 |
| 3 | −14.09265 | 1.0 | | |
| *4 | −10.86467 | 1.5 | 1.58518 | 30.24 |
| 5 | 203.88888 | 1.5 | | |
| 6 | −95.39091 | 3.0 | 1.49108 | 57.57 |
| *7 | −11.57101 | 1.5 | | |
| 8 | 0.00000 | 1.0 | 1.49108 | 57.57 |
| 9 | 0.00000 | 15.0 | | |
| 10 | E.P | | | |

[Aspherical Data]

Surface 2 κ = −1.7818, A6 = 0.0
Surface 4 κ = 1.0000, A6 = 0.65762E−06
Surface 7 κ = 0.5034, A6 = 0.0

Figure 28:
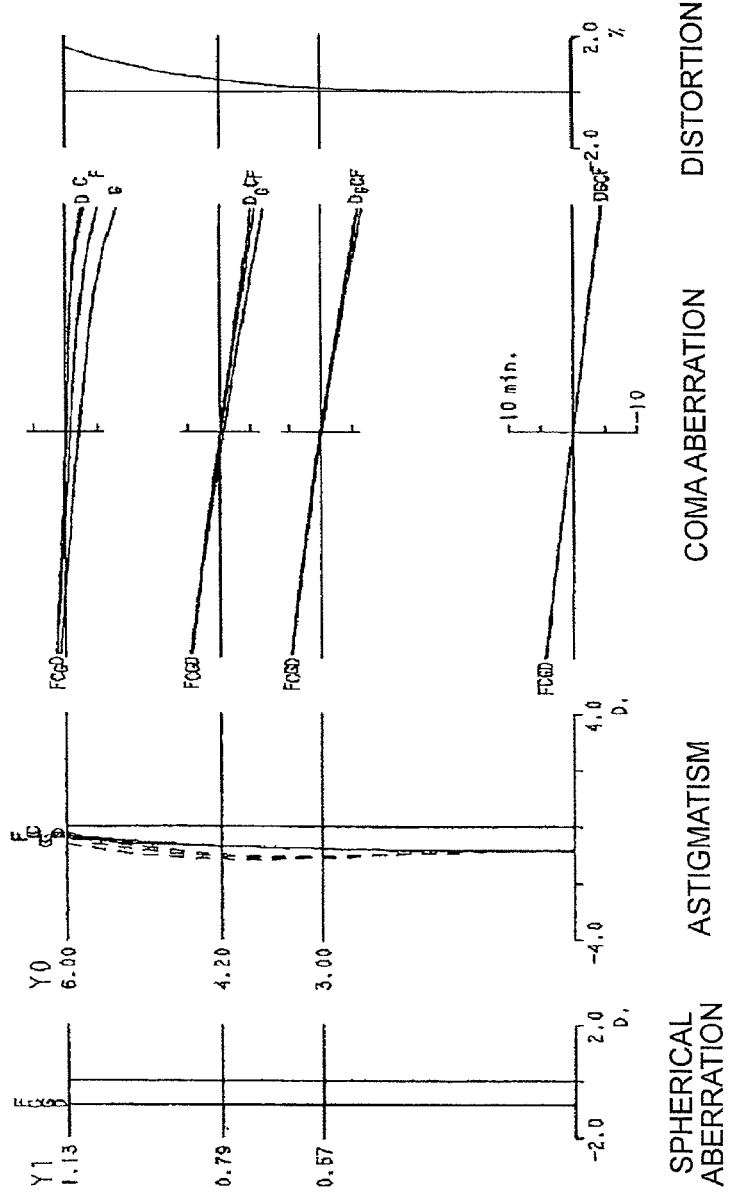
FIG. 28 is a set of graphs showing various aberrations of the eyepiece optical system according to a reference example.

FIG. 28 is a set of graphs showing various aberrations of the eyepiece optical system 70 according to this reference example. As each graph showing aberrations clarifies, the eyepiece optical system 70 according to this reference example corrects various aberrations satisfactorily and has superb image forming performance.

Now a camera equipped with the eyepiece optical system according to Embodiment 2 or 3 will be described with reference to FIG. 29.

Figure 29:
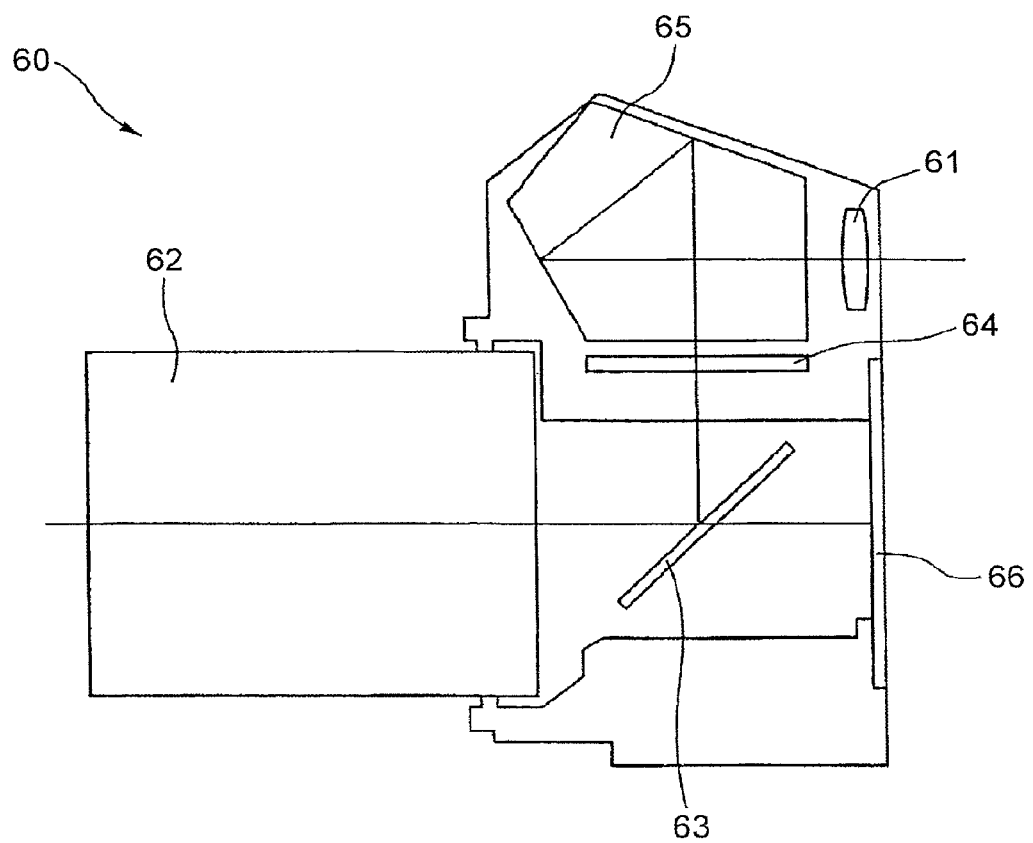
FIG. 29 is a diagram depicting a configuration of a camera equipped with the eyepiece optical system according to Embodiment 2 or 3.

FIG. 29 is a diagram depicting a camera equipped with the eyepiece optical system according to Embodiment 2 or 3. This camera 60 is a digital single-lens reflex camera equipped with the eyepiece optical system according to Example 4 as the eyepiece optical system 61.

In this camera 60, light from an object (not illustrated) is collected by an image capturing lens 62, and forms an image on a focal plane plate 64 via a quick return mirror 63. The light, which formed an image on the focal plane plate 64, is reflected a plurality of times in a penta prism 65, and is guided to the eyepiece optical system 61. Thereby the user can view the object image as an erected image through the eyepiece optical system 61.

If the user presses a release button (not illustrated), the quick return mirror 63 is retracted from outside the optical path, and the light from the object (not illustrated) reaches the picture element 66. Thereby the light from the object is captured by the picture element 66, and is recorded in a memory (not illustrated) as the object image. Thus the user can photograph the object using this camera 60.

Here the eyepiece optical system according to Example 4, included in this camera 60 as the eyepiece optical system 61, avoids the generation of ghosts without affecting the aberration performance of the eyepiece lens, as described above. Therefore this camera 60 can implement satisfactory optical performance. The same effect as this camera 60 can be demonstrated even in a camera that includes the eyepiece optical system according to any one of Example 5 to Example 8 as the eyepiece optical system 61. Further, the same effect as the camera 60 can also be demonstrated even in a case when a camera that has no quick return mirror 63 is equipped with the eyepiece optical system according to any one of the above mentioned examples.

As described above, this embodiment can provide: an eyepiece optical system that can effectively reduce ghosts by reflecting the light emitted from a bright point in the field of view on the surface of the optical member located closer to the eye than the eyepiece lens; and an optical apparatus equipped with this eyepiece optical system.

EXPLANATION OF NUMERALS AND CHARACTERS

G1 first lens group (Embodiment 1)
G2 second lens group (Embodiment 1)
G3 third lens group (Embodiment 1)
EL (EL1 to EL3) eyepiece lens (Embodiment 1)
VF viewfinder optical system (Embodiment 1)
CAM digital single-lens reflex camera (optical apparatus/ Embodiment 1)
101 antireflection coating (Embodiment 1)
102 optical member (Embodiment 1)
10, 20, 30, 40, 50, 70 eyepiece optical system (Embodiments 2 and 3)
11, 21, 31, 41, 51, 71 eyepiece lens (Embodiments 2 and 3)
12, 22, 32, 42, 52, 72 protective window (Embodiments 2 and 3)
L13, L23, L73 positive lens (Embodiments 2 and 3)
L14, L24, L74 negative lens (Embodiments 2 and 3)
L15, L25, L75 positive meniscus lens (Embodiments 2 and 3)
16, 26, 36, 46, 56, 76 display member (Embodiments 2 and 3)
L33, L43, L53 positive meniscus lens (Embodiments 2 and 3)
L34, L44, L54 cemented lens (Embodiments 2 and 3)
60 camera (optical apparatus/Embodiments 2 and 3)
61 eyepiece optical system (Embodiments 2 and 3)
62 image capturing lens (Embodiments 2 and 3)
63 quick return mirror (Embodiments 2 and 3)
64 focal plane plate (Embodiments 2 and 3)
65 penta prism (Embodiments 2 and 3)
66 picture element (Embodiments 2 and 3)
E.P eye point

The invention claimed is:

1. An eyepiece lens comprising, in order from an object along an optical axis,
a first lens group having negative refractive power, a second lens group having positive refractive power, and a third lens group having negative refractive power, wherein
an antireflection coating is disposed on at least one optical surface of the eyepiece lens, and
wherein the following conditional expression is satisfied:

$Nn(ABE) > 1.870$ where Nn (ABE) denotes an average value of refractive indexes, with respect to d-line, of all lenses having negative refractive power in the first and third lens groups.

2. The eyepiece lens according to claim 1, wherein at least one of the first lens group, the second lens group and the third lens group is movable along an optical axis to perform diopter adjustment.

3. The eyepiece lens according to claim 1, wherein the second lens group includes a biconvex lens component.

4. The eyepiece lens according to claim 1, wherein the third lens group includes a meniscus lens component having a convex surface facing the object.

5. The eyepiece lens according to claim 1, wherein the following conditional expression is satisfied:

$$30.0 > \nu(ABE)$$

where ν (ABE) denotes an average value of Abbe numbers, with respect to d-line, of all lenses having negative refractive power in the first and third lens groups.

6. The eyepiece lens according to claim 5, wherein the following conditional expression is satisfied:

$$\nu 2 > 40$$

where ν2 denotes an average value of Abbe numbers, with respect to d-line, of all lenses in the second lens group.

7. The eyepiece lens according to claim 1, wherein at least one optical surface of the second lens group is aspherical.

8. The eyepiece lens according to claim 1, wherein the following conditional expression is satisfied:

$$S3 > 2.4$$

where S3 denotes a shape factor of a lens component located closest to an eye point in the third lens group, which is a value defined by $(Ro_3+Re_3)/(Ro_3-Re_3)$, where $Ro_3$ denotes a radius of curvature of an object side surface of the lens component, and $Re_3$ denotes a radius of curvature of the eye point side surface of the lens component.

9. The eyepiece lens according to claim 1, wherein the second lens group is movable along an optical axis to perform diopter adjustment.

10. The eyepiece lens according to claim 1, wherein the antireflection coating is a multilayer film, and at least one of the layers satisfies the following conditional expression:

$$nd \leq 1.30$$

where nd denotes a refractive index with respect to d-line.

11. The eyepiece lens according to claim 10, wherein an outermost surface layer constituting the multilayer film satisfies the conditional expression:

$$nd \leq 1.30.$$

12. The eyepiece lens according to claim 10, wherein said one optical surface on which the antireflection coating is formed is a lens surface which is concave as viewed from an eye point.

13. The eyepiece lens according to claim 12, wherein the lens surface which is concave viewed from the eye point is a lens surface closest to the object among the optical surfaces of the first, second, and third lens groups.

14. The eyepiece lens according to claim 12, wherein the lens surface which is concave viewed from the eye point is a lens surface closest to an image plane among the optical surfaces of the first, second, and third lens groups.

15. The eyepiece lens according to claim 10, wherein said one optical surface on which the antireflection coating is formed is a lens surface which is concave as viewed from an object.

16. The eyepiece lens according to claim 15, wherein the concave lens surface on which the antireflection coating is formed is a lens surface closest to an image plane among the optical surfaces of the second lens group.

17. The eyepiece lens according to claim 10, wherein said one optical surface on which the antireflection coating is formed is an optical surface other than an optical surface closest to an eye point.

18. A viewfinder optical system for viewing an image formed by an objective lens, comprising the eyepiece lens according to claim 1.

19. An optical apparatus, comprising the viewfinder optical system according to claim 18.

20. A method for manufacturing an eyepiece lens comprising:
constructing the eyepiece lens to include, in order from an object along an optical axis, a first lens group having negative refractive power, a second lens group having positive refractive power, and a third lens group having negative refractive power;
disposing an antireflection coating, which includes at least one layer formed by a wet process, on at least one optical surface of the eyepiece lens; and
disposing a lens having said one optical surface on which the antireflection coating is formed, in a lens barrel, and
wherein the eyepiece lens is constructed such that the following conditional expression is satisfied:

$$Nn(ABE) > 1.870$$

where Nn (ABE) denotes an average value of refractive indexes, with respect to d-line, of all lenses having negative refractive power in the first and third lens groups.

21. The method for manufacturing an eyepiece lens according to claim 20, wherein the following conditional expression is satisfied:

$$nd \leq 1.30$$

where nd denotes a refractive index, with respect to d-line, of said one layer formed by the wet process.

22. The method for manufacturing an eyepiece lens according to claim 20, wherein said one optical surface on which the antireflection coating is formed is a lens surface which is concave as viewed from an eye point.

* * * * *